(12) United States Patent
Ruckman et al.

(10) Patent No.: US 12,128,972 B2
(45) Date of Patent: Oct. 29, 2024

(54) HITCH, RECEIVER ADAPTER, AND GUIDE THEREFOR

(71) Applicants: Keegan Dean Ruckman, Pleasant Hill, MO (US); Tyler Andrew Voss, Columbia, MO (US)

(72) Inventors: Keegan Dean Ruckman, Pleasant Hill, MO (US); Tyler Andrew Voss, Columbia, MO (US)

( * ) Notice: Subject to any disclaimer, the term of this patent is extended or adjusted under 35 U.S.C. 154(b) by 0 days.

(21) Appl. No.: 18/142,328

(22) Filed: May 2, 2023

(65) Prior Publication Data

US 2023/0356791 A1 Nov. 9, 2023

Related U.S. Application Data

(60) Provisional application No. 63/337,797, filed on May 3, 2022.

(51) Int. Cl.
*B62D 53/12* (2006.01)
*B60D 1/06* (2006.01)

(52) U.S. Cl.
CPC .............. *B62D 53/12* (2013.01); *B60D 1/065* (2013.01)

(58) Field of Classification Search
CPC ..... B62D 53/08; B62D 53/0828; B62D 53/12
See application file for complete search history.

(56) References Cited

U.S. PATENT DOCUMENTS

| 3,013,815 | A | * | 12/1961 | Geerds | B62D 53/10 |
| | | | | | 280/435 |
| 3,442,533 | A | * | 5/1969 | Dean | B62D 53/0885 |
| | | | | | 280/435 |
| 3,787,076 | A | * | 1/1974 | Walther | B62D 53/12 |
| | | | | | 280/435 |
| 3,941,407 | A | | 3/1976 | Breford | |
| 4,213,590 | A | * | 7/1980 | VanDyke | B62D 53/12 |
| | | | | | 410/64 |
| 4,333,666 | A | * | 6/1982 | Hammonds | B62D 53/10 |
| | | | | | 280/435 |
| 4,903,978 | A | | 2/1990 | Schrum | |
| 4,991,865 | A | | 2/1991 | Francisco | |
| 5,120,080 | A | | 6/1992 | Ritter | |
| 5,183,284 | A | * | 2/1993 | Paplinski | B62D 53/10 |
| | | | | | 280/508 |
| 5,788,257 | A | | 8/1998 | Meyerhofer | |
| 6,494,477 | B1 | | 12/2002 | Parker | |
| 6,659,490 | B1 | | 12/2003 | Simpson | |
| 6,698,783 | B1 | | 3/2004 | Zechbauer | |
| 6,908,093 | B1 | * | 6/2005 | Putnam | B62D 53/12 |
| | | | | | 280/436 |

(Continued)

OTHER PUBLICATIONS

Drop/Rise Hitch, available at: https://www.bulletproofhitches.com/products/2-0-medium-duty-6-drop-rise?currency=USD.

(Continued)

*Primary Examiner* — Kevin Hurley

(57) ABSTRACT

A hitch is provided. The hitch has a ball adapter including a rod. The hitch also has a receiver adapter including a guide having a pair of rails that define a pathway sized to receive the rod of the ball adapter. The receiver adapter also includes a lock having a pair of fingers spaced apart from one another to receive the rod between the fingers such that, when the rod is in the pathway, the lock is positionable to wrap partly around the rod.

17 Claims, 39 Drawing Sheets

(56) References Cited

U.S. PATENT DOCUMENTS

| | | | |
|---|---|---|---|
| 9,150,065 | B1 | 10/2015 | Lapensee |
| 10,953,712 | B2 | 3/2021 | Weigert |
| 2009/0295125 | A1 | 12/2009 | Andersen |
| 2011/0233897 | A1 | 9/2011 | Moore |
| 2017/0370403 | A1 | 12/2017 | Manieri |
| 2020/0267884 | A1 | 8/2020 | Putz |

OTHER PUBLICATIONS

Adjustable Channel Bracket, available at: https://www.etrailer.com/Accessories-and-Parts/Demco/DM59602.html.
King Pin to Gooseneck Ball Adapter, available at: https://www.fayettedistribution.com/Wallace-Forge-King-Pin-Gooseneck-Ball-Adapter-p/2085295.htm.
Bear Jaw Car Door Latch, available at: https://www.speedwaymotors.com/Universal-Standard-Bear-Jaw-Car-Door-Latch,2267.html.

* cited by examiner

HITCH, RECEIVER ADAPTER, AND GUIDE THEREFOR

CROSS-REFERENCE TO RELATED APPLICATIONS

This application claims the benefit of U.S. Provisional Patent Application No. 63/337,797 entitled "Universal Self Aligning Hitch" and filed on May 3, 2022, which is incorporated by reference herein in its entirety.

BACKGROUND

The embodiments set forth herein relate generally to hitches and, more particularly, to hitches for towing a trailer.

When towing a trailer using a vehicle, it may be laborious and time consuming to connect the trailer to the vehicle. It may take the driver of the vehicle multiple attempts to reverse the vehicle toward the trailer such that the vehicle and the trailer are properly aligned for connecting the trailer to the vehicle. Sometimes a person other than the driver of the vehicle may assist with guiding the driver in reversing the vehicle toward the trailer. And, in the event that another person is not present to assist in guiding the driver, the driver may enter and exit the vehicle numerous times in order to properly align the vehicle and the trailer. Additionally, if the vehicle is used to tow trailers of varying sizes, the driver may manually swap one hitch component for another hitch component every time a differently sized trailer is to be towed. There is thus a need for a hitch that makes it easier to tow trailers of multiple sizes and/or makes it easier to connect a trailer to a vehicle.

SUMMARY

In one aspect, a hitch is provided. The hitch has a ball adapter including a rod. The hitch also has a receiver adapter including a guide having a pair of rails that define a pathway sized to receive the rod of the ball adapter. The receiver adapter also includes a lock having a pair of fingers spaced apart from one another to receive the rod between the fingers such that, when the rod is in the pathway, the lock is positionable to wrap partly around the rod.

In another aspect, a receiver adapter for a hitch is provided. The receiver adapter is attachable to a ball adapter having a rod. The receiver adapter includes a guide having a pair of rails that define a pathway sized to receive the rod of the ball adapter. The receiver adapter also includes a lock having a pair of fingers spaced apart from one another to receive the rod between the fingers such that, when the rod is in the pathway, the lock is positionable to wrap partly around the rod.

In yet another aspect, a guide for a receiver adapter of a hitch is provided. The receiver adapter has a lock with a pair of fingers and has a retainer insertable between the fingers of the lock to attach the receiver adapter to a rod of a ball adapter when the rod is received between the fingers. The guide has a body including a pair of rails that define a pathway between the rails, the pathway sized to receive the rod of the ball adapter. The body is hollow to receive the lock and the retainer such that, when the rod is received between the fingers, the retainer and the fingers together surround the rod.

BRIEF DESCRIPTION OF DRAWINGS

Embodiments set forth in the detailed description below will refer to the following figures, with like reference numerals indicating like aspects of the embodiments throughout the figures.

DETAILED DESCRIPTION

Embodiments will now be described with reference to the foregoing figures. The embodiments described herein are not intended to limit the scope of this disclosure but, rather, are intended to serve as examples that are subject to implementation and modification as desired by the person having ordinary skill in the art.

Figure 1:
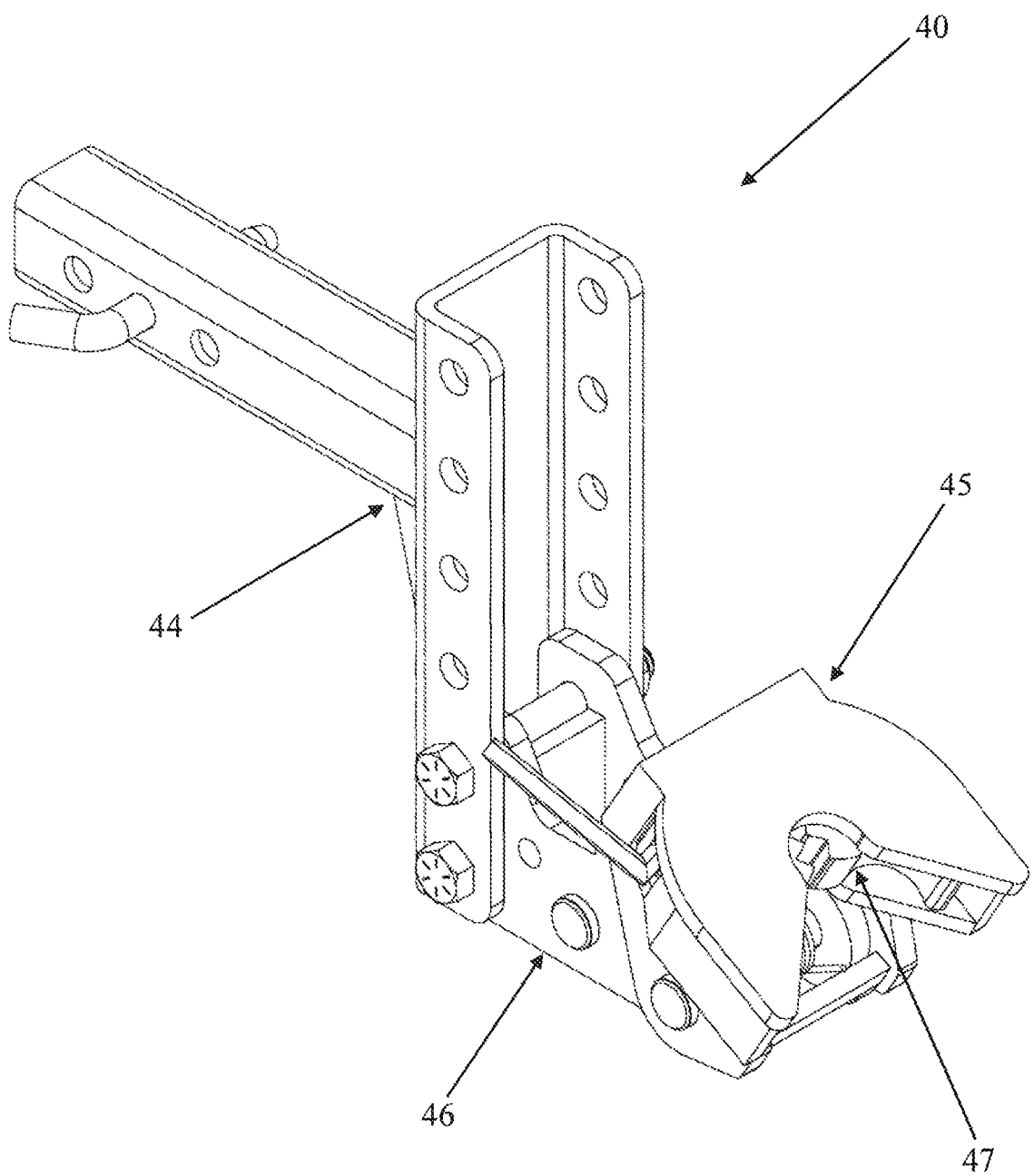
FIG. 1 is a front perspective view of an embodiment of a hitch receiver adapter in its pre-hitched state.
Figure 2:
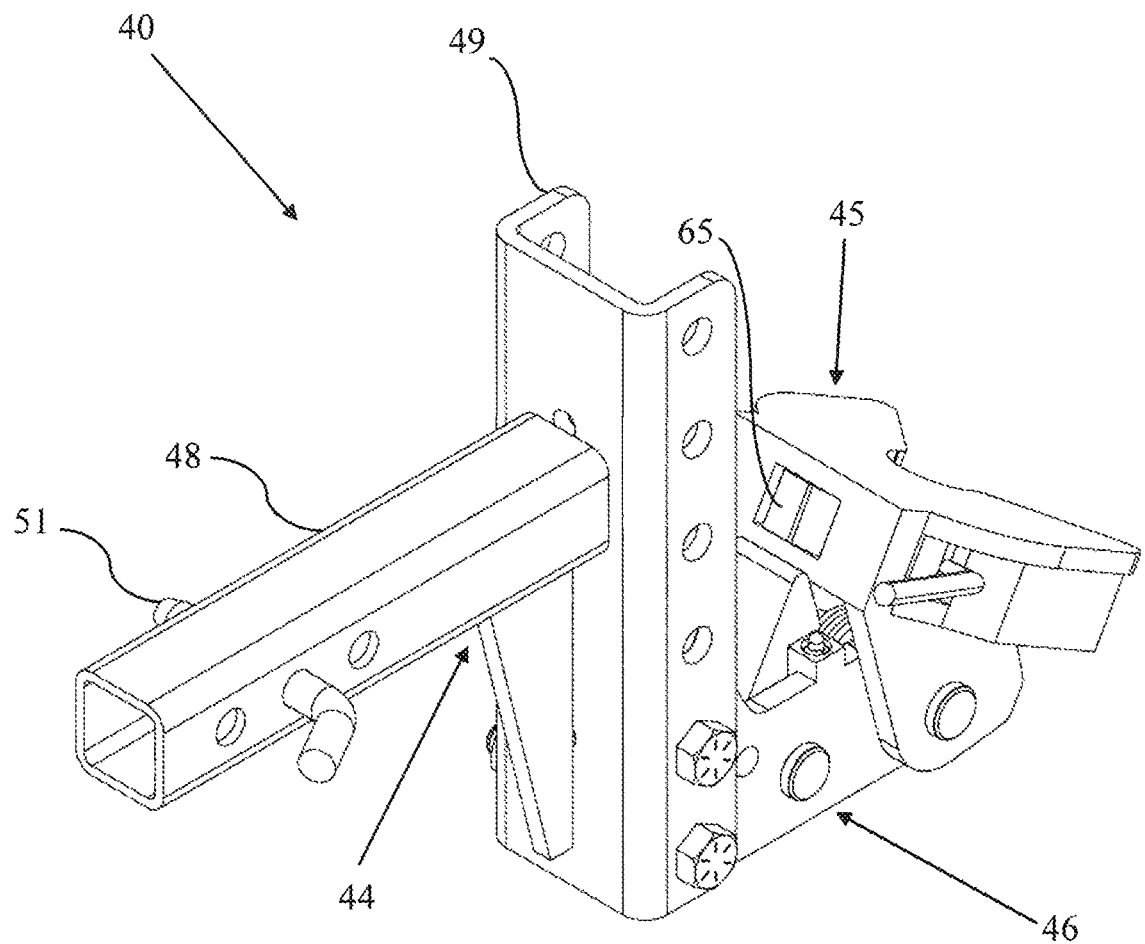
FIG. 2 is a back perspective view of the hitch receiver adapter shown in FIG. 1.
Figure 3:
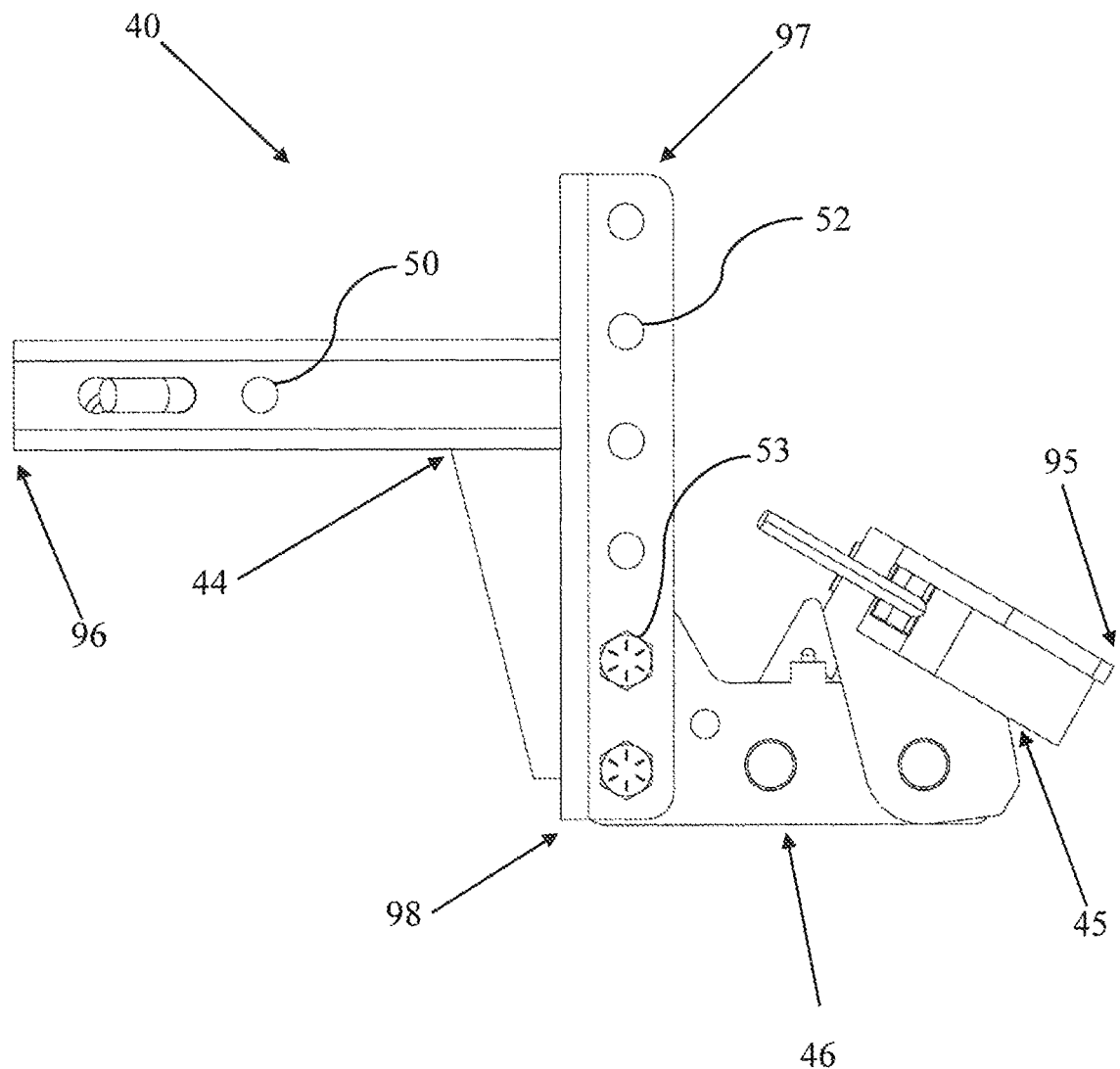
FIG. 3 is a side view of the hitch receiver adapter shown in FIG. 1.
Figure 4:
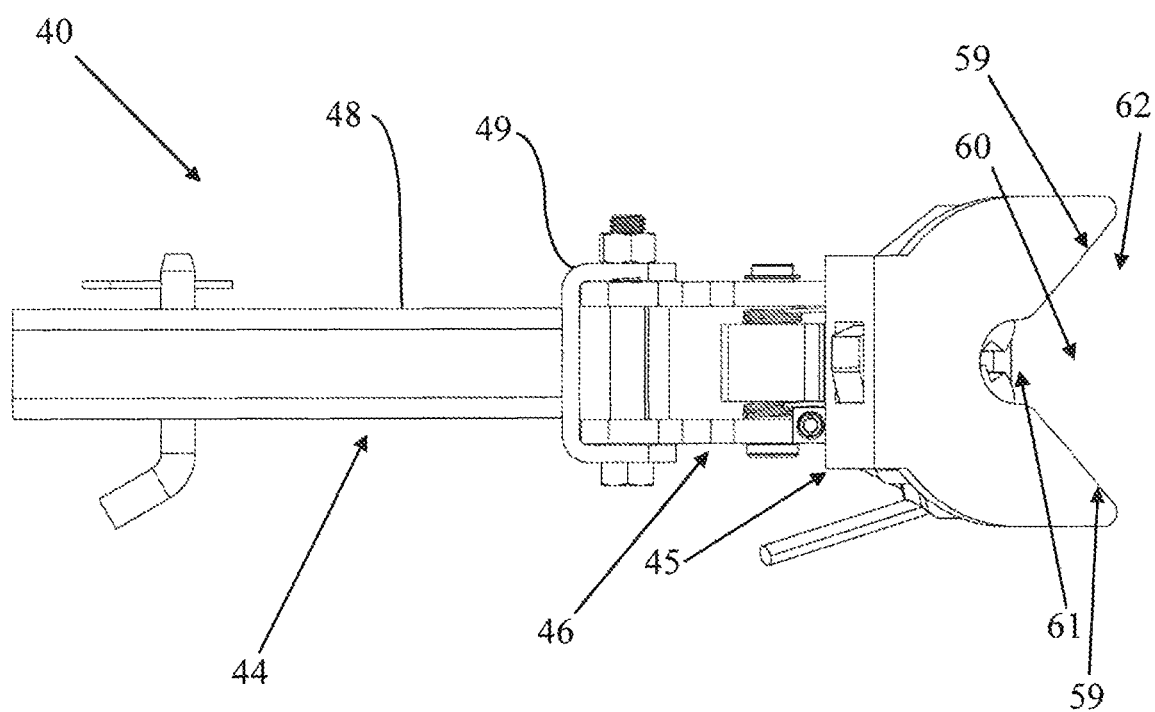
FIG. 4 is a top view of the hitch receiver adapter shown in FIG. 1.
Figure 5:
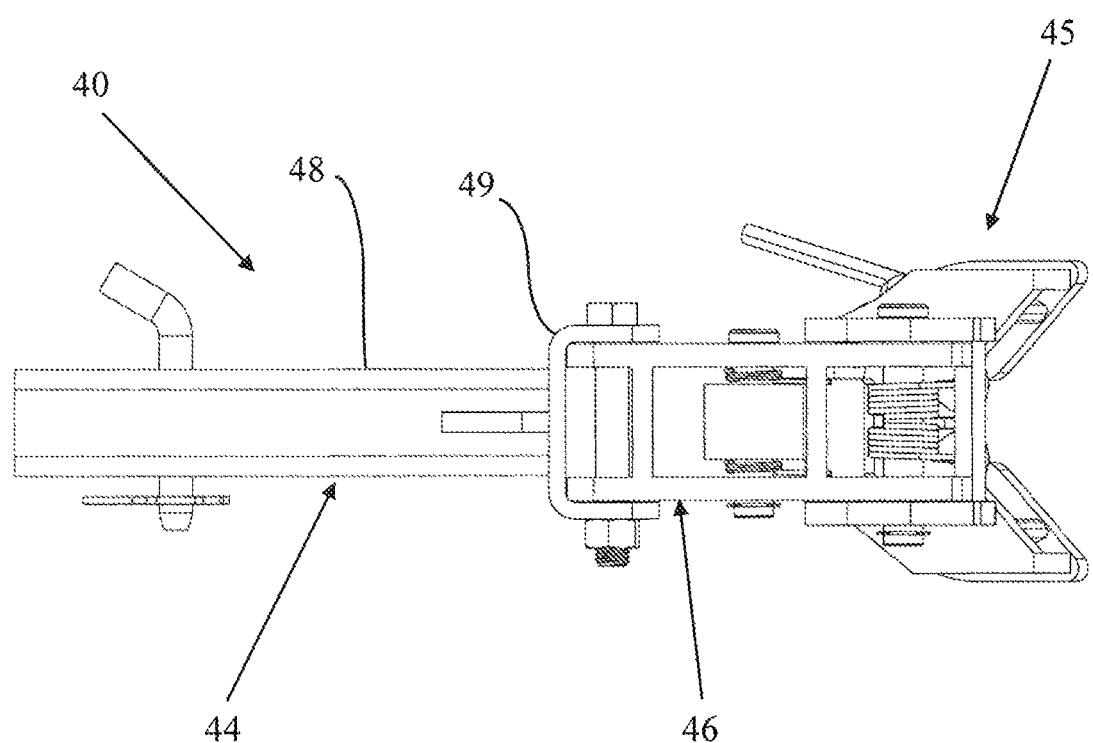
FIG. 5 is a bottom view of the hitch receiver adapter shown in FIG. 1.
Figure 6:
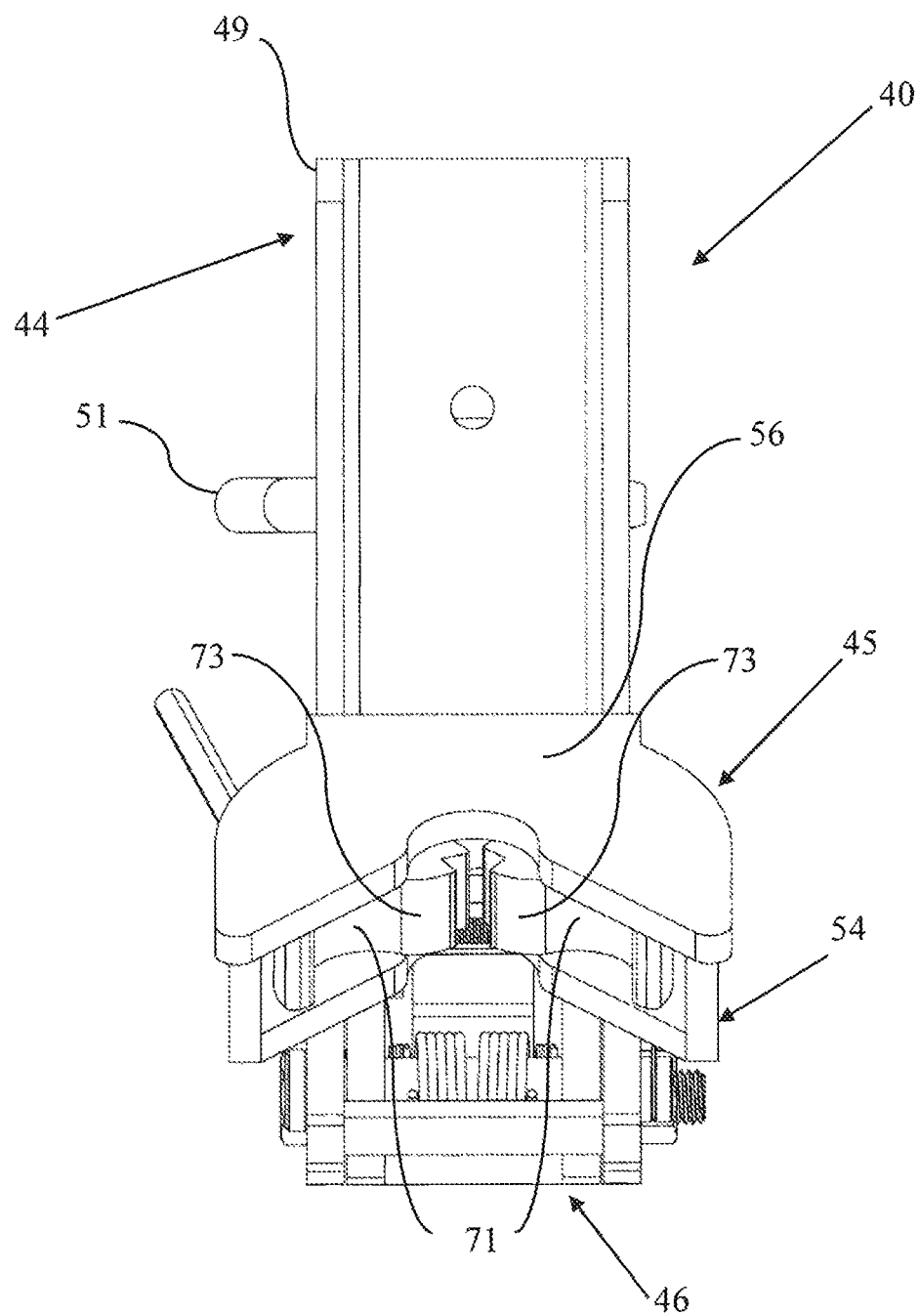
FIG. 6 is a front view of the hitch receiver adapter shown in FIG. 1.
Figure 7:
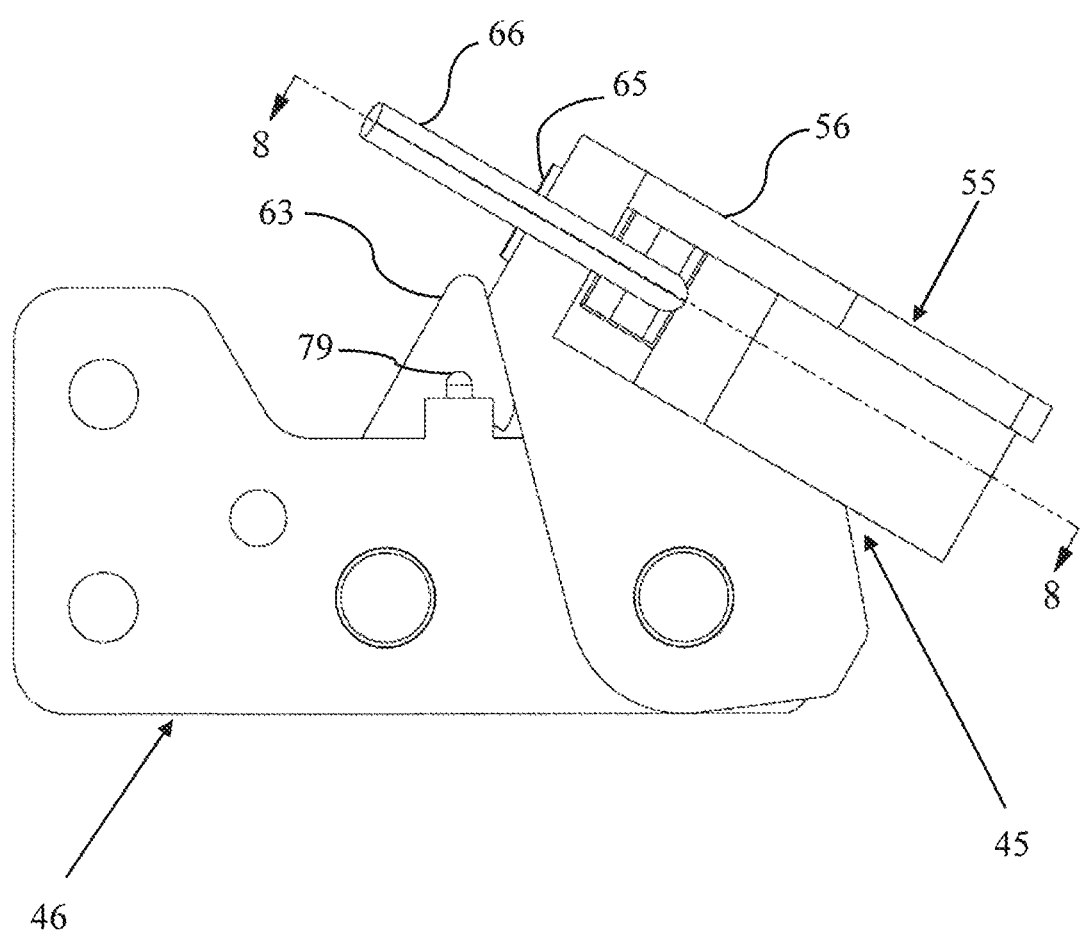
FIG. 7 is a side view of a subassembly of the hitch receiver adapter shown in FIG. 1.

FIGS. 1-10 illustrate an embodiment of a hitch receiver adapter 40 in its pre-hitched state. In the illustrated embodiment and state, hitch receiver adapter 40 is insertable into, and removably attachable to, a socket of a towing frame of a vehicle to facilitate towing a trailer using the vehicle, as set forth in more detail below. In other embodiments, rather than being insertable into a socket of a towing frame of a vehicle, receiver adapter 40 may be structured for attachment to the towing frame of a vehicle in any suitable manner. For purposes of orienting components of receiver adapter 40 (and other structures associated therewith) relative to one another, receiver adapter 40 (as shown in FIG. 3) has a front 95, a back 96, a top 97, and a bottom 98, such that relative front-to-back locations and movements of various structures set forth herein are referred to using language such as, for example, "horizontal", "front", "back", "forward", "backward", or "behind" and such that relative top-to-bottom locations and movements of various structures set forth herein are referred to using language such as, for example, "vertical", "top", "bottom", "upper", or "lower".

In the illustrated embodiment, receiver adapter 40 includes: an adjustable hitch receiver 44; and an adapter alignment guide 45 attached to adjustable hitch receiver 44 via a connecting coupler 46 and via an adapter collar lock 47. Adjustable hitch receiver 44 serves as a mount (or a bracket) by which receiver adapter 40 is coupled to the towing frame of a vehicle, and connecting coupler 46 serves as a base (or a support) upon which guide 45 is seated. Adjustable hitch receiver 44 includes a tube 48 sized for insertion into the receiver socket of the vehicle's towing frame, and a channel 49 that is connected to tube 48 in substantially perpendicular relation thereto such that, when tube 48 is inserted into the receiver socket, tube 48 is oriented substantially parallel to the ground while channel 49 is oriented substantially perpendicular to the ground. Tube 48 has a plurality of holes 50 for fixing tube 48 within the receiver socket of the towing frame at a desired length of extension from the socket via a pin 51. Channel 49 also has a plurality of holes 52 for fixing coupler 46 within channel 49 at a desired height above the ground via a plurality of bolts 53. In other embodiments, the adjustable hitch receiver and the coupler may be structured, attachable, and adjustable relative to one another in any suitable manner that facilitates permitting receiver adapter 40 to function as described herein.

In the illustrated embodiment, guide 45 includes a hollow body 54 having a top plate 55, and body 54 is pivotably attached to coupler 46 via a pin 57 such that guide 45 is biased forward about pin 57 via a spring 58 to obliquely orient plate 55 relative to the ground. Guide 45 contacts coupler 46 during pivoting to facilitate limiting the range within which guide 45 is permitted to pivot forward and backward about pin 57 (e.g., the forward pivoting of guide 45 is limited to when a top surface 56 of top plate 55 is oriented at, for example, about thirty degrees relative to the ground, and the backward pivoting of guide 45 is limited to when top surface 56 of top plate 55 is oriented substantially parallel to the ground). Body 54 has a pair of rails 59 that together define a pathway 60 therebetween, wherein pathway 60 tapers toward a semi-circular pocket 61 of the pathway 60. Although rails 59 are spaced about six inches apart at an entrance 62 of pathway 60 in the illustrated embodiment, rails 59 may have any suitable spacing at entrance 62 in some embodiments. Alternatively, in other embodiments, the guide may be structured in any suitable manner that facilitates permitting receiver adapter 40 to function as described herein.

Figure 8:
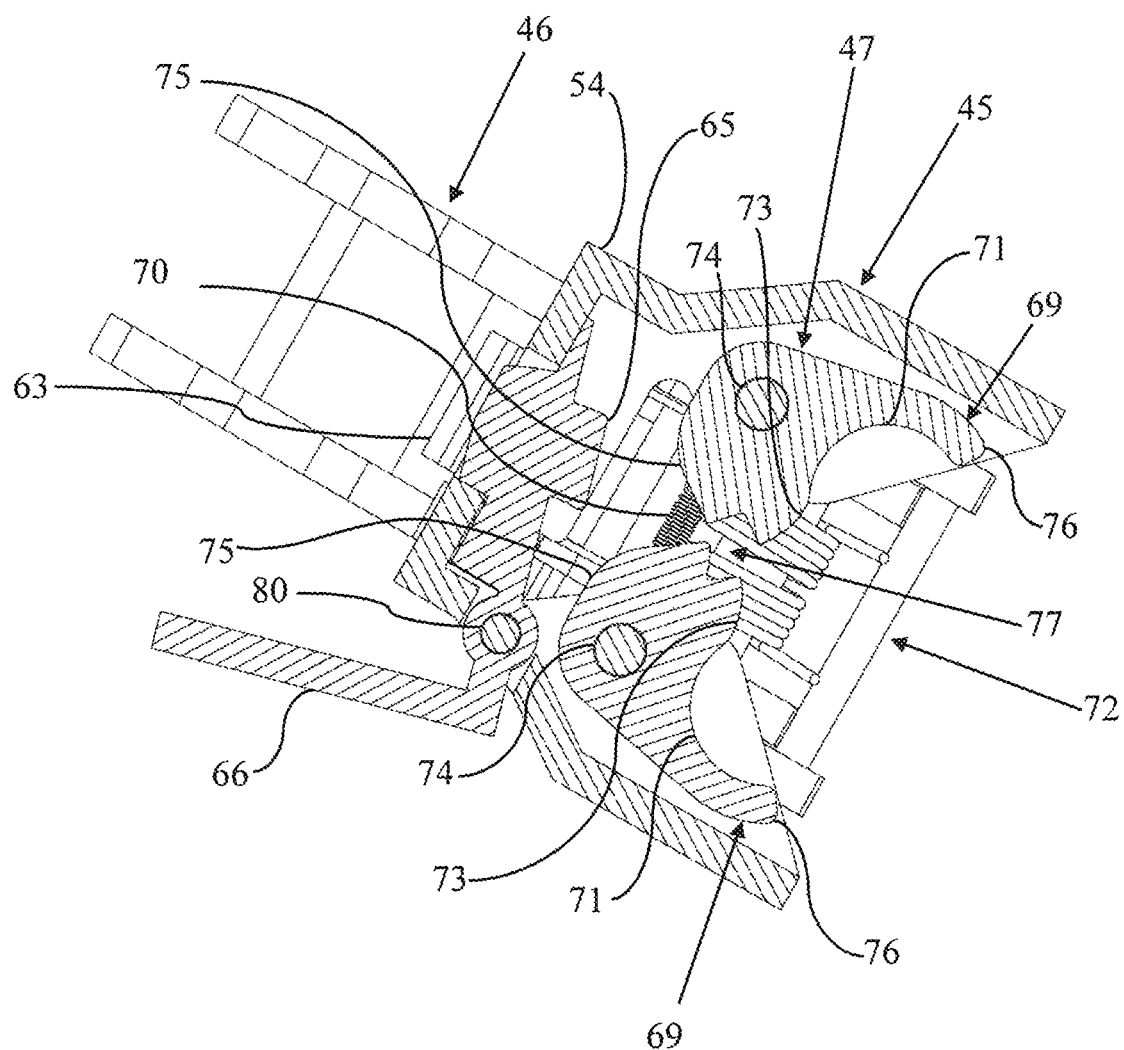
FIG. 8 is a cross-sectional view of the subassembly shown in FIG. 7 taken along plane 8-8 of FIG. 7.
Figure 9:
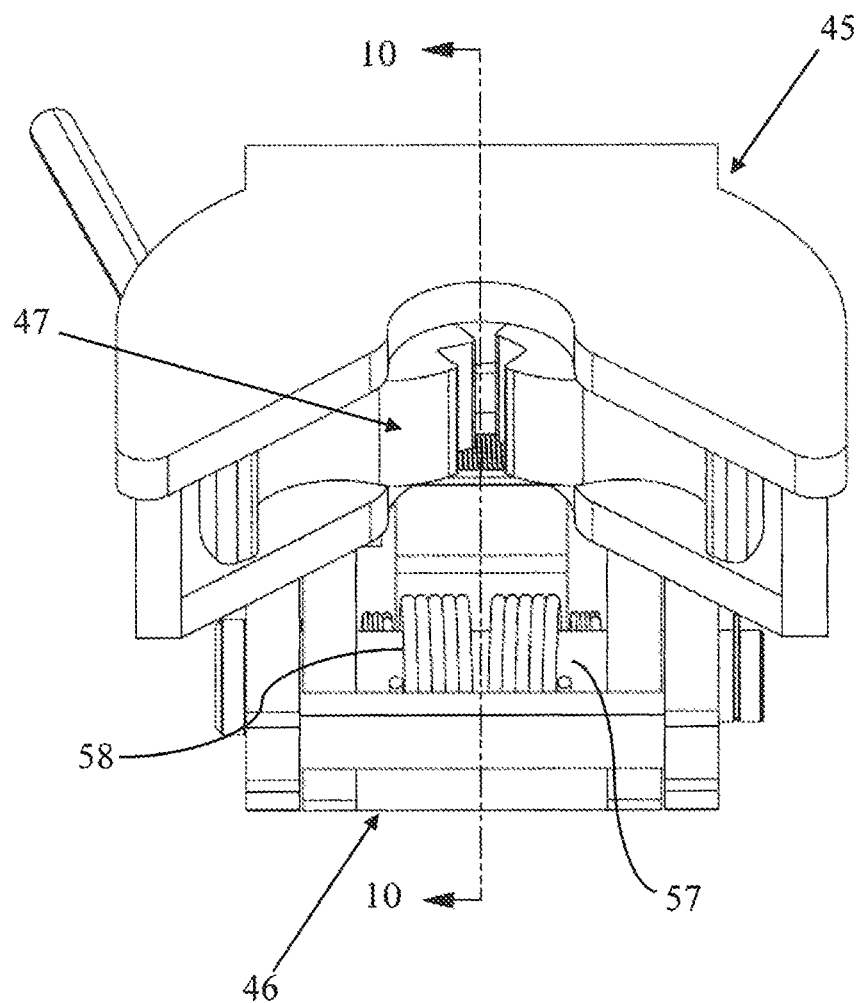
FIG. 9 is a front view of the subassembly shown in FIG. 7.
Figure 10:
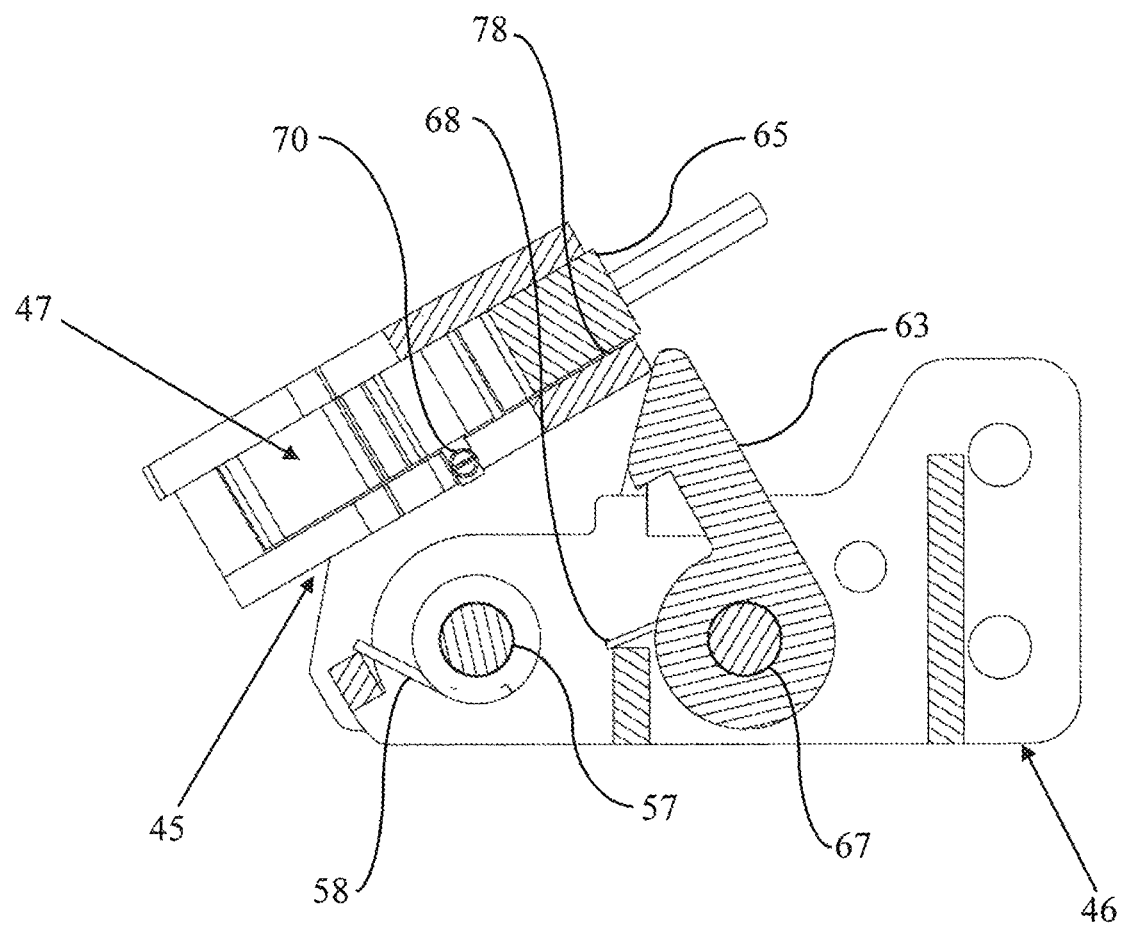
FIG. 10 is a cross-sectional view of the subassembly shown in FIG. 7 taken along plane 10-10 of FIG. 9.
Figure 23:
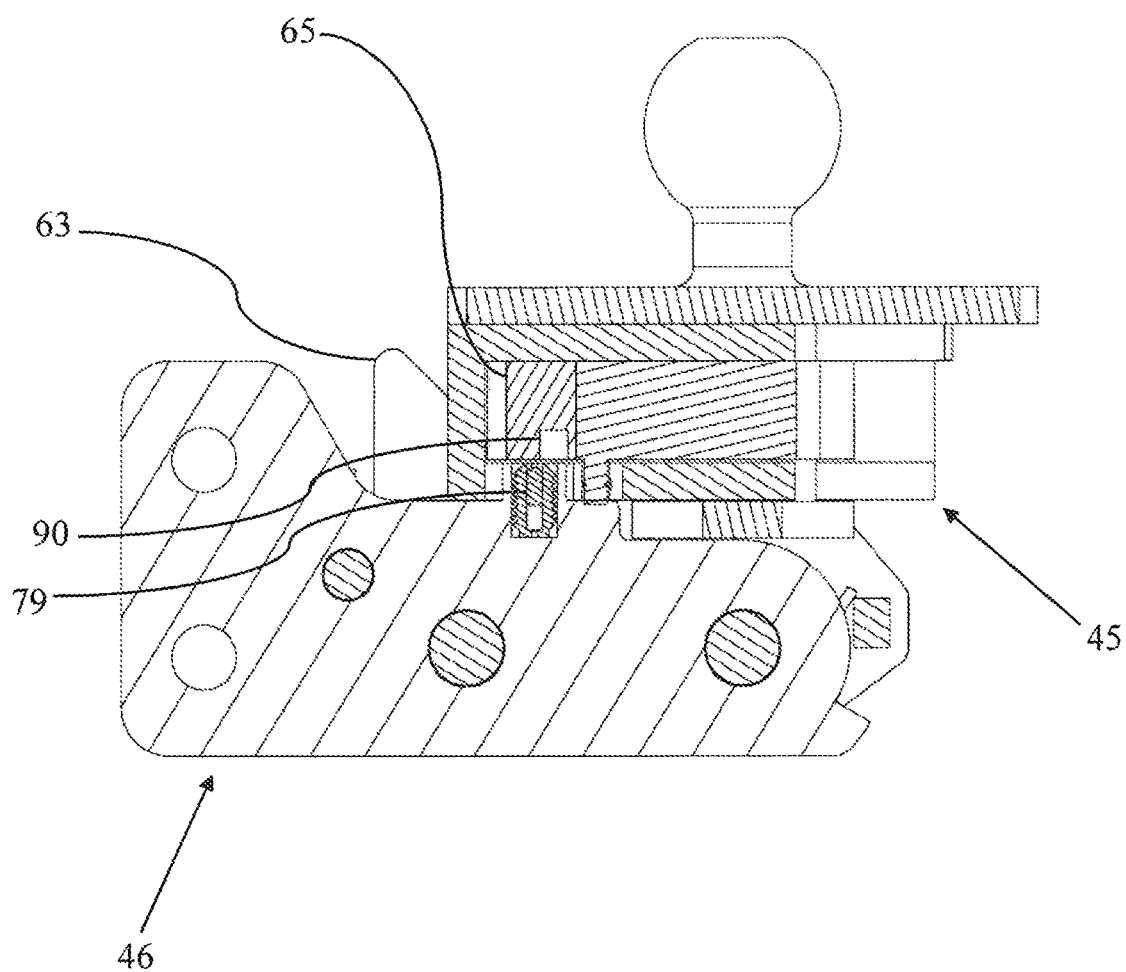
FIG. 23 is a cross-sectional view of the subassembly shown in FIG. 19 taken along plane 23-23 of FIG. 22.
Figure 24:
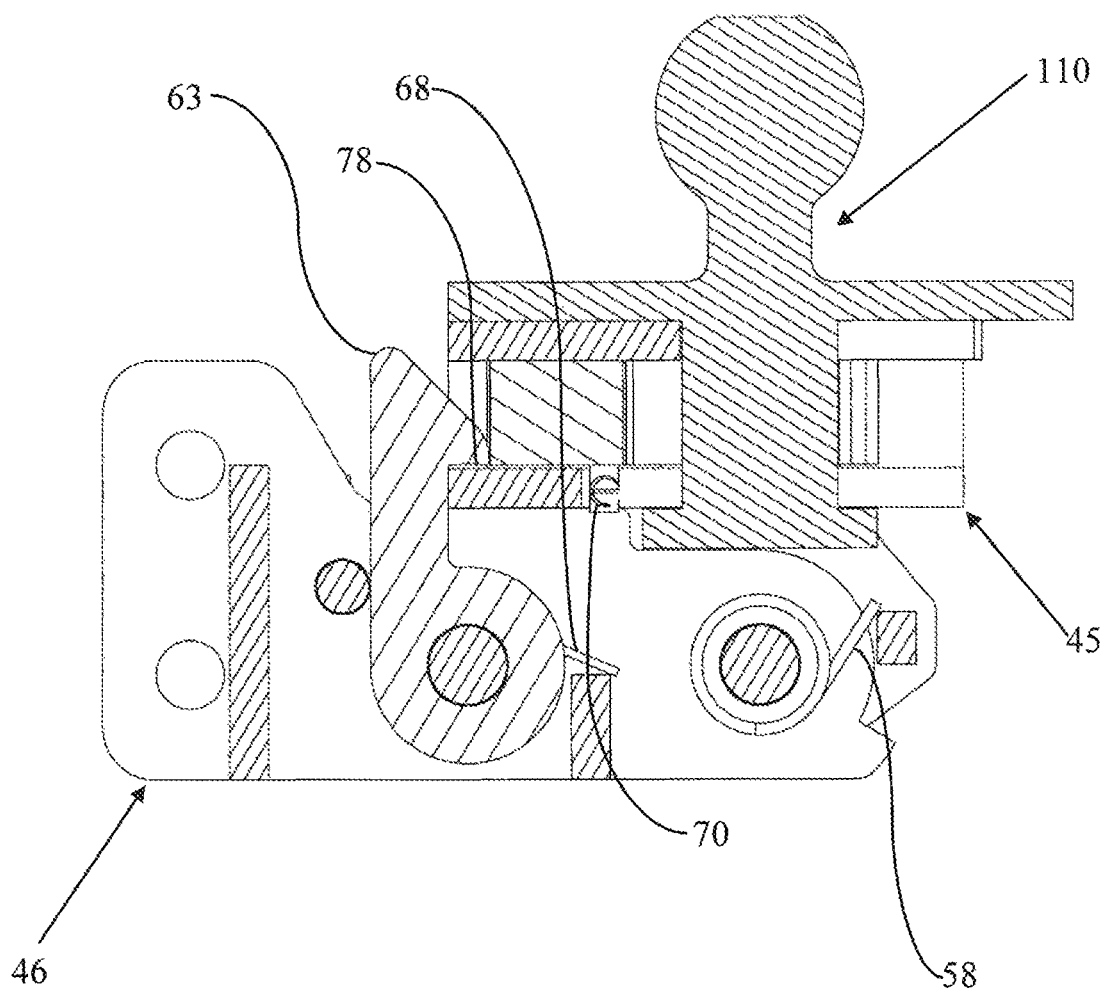
FIG. 24 is a cross-sectional view of the subassembly shown in FIG. 19 taken along plane 24-24 of FIG. 22.
Figure 25:
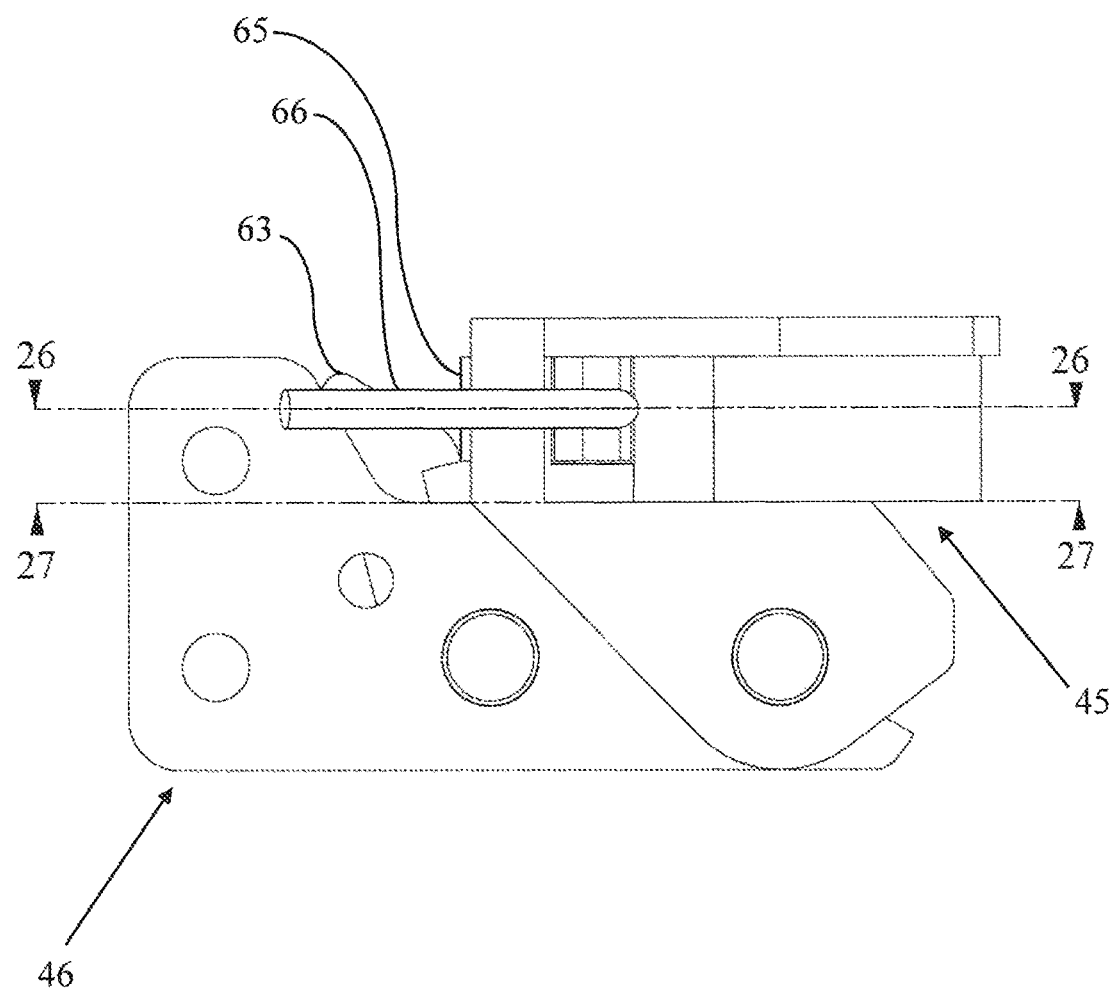
FIG. 25 is a side view of the subassembly shown in FIG. 7 in its post-hitched state.
Figure 26:
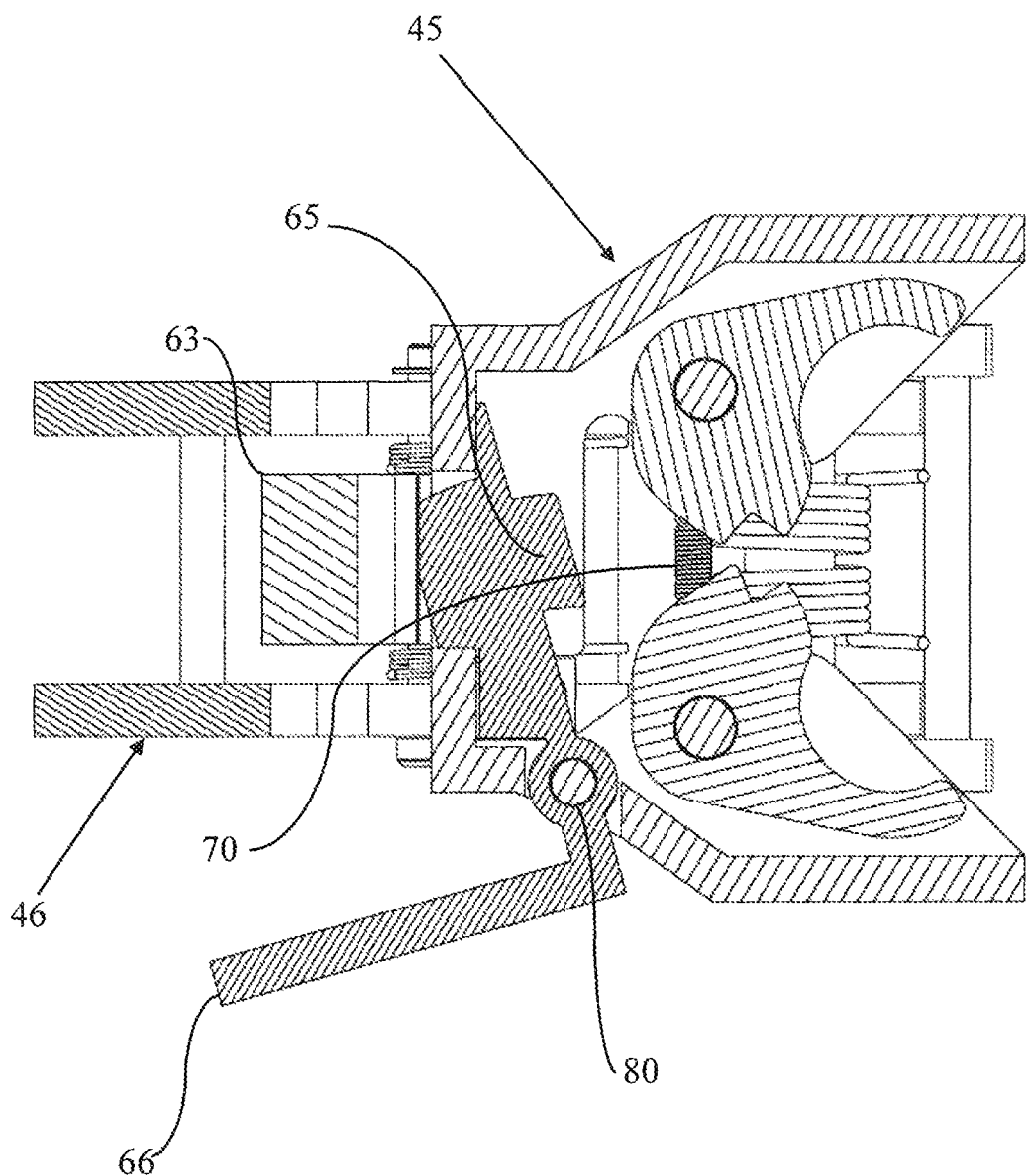
FIG. 26 is a cross-sectional view of the subassembly shown in FIG. 7 in the post-hitched state shown in FIG. 25 and taken along plane 26-26 of FIG. 25.
Figure 27:
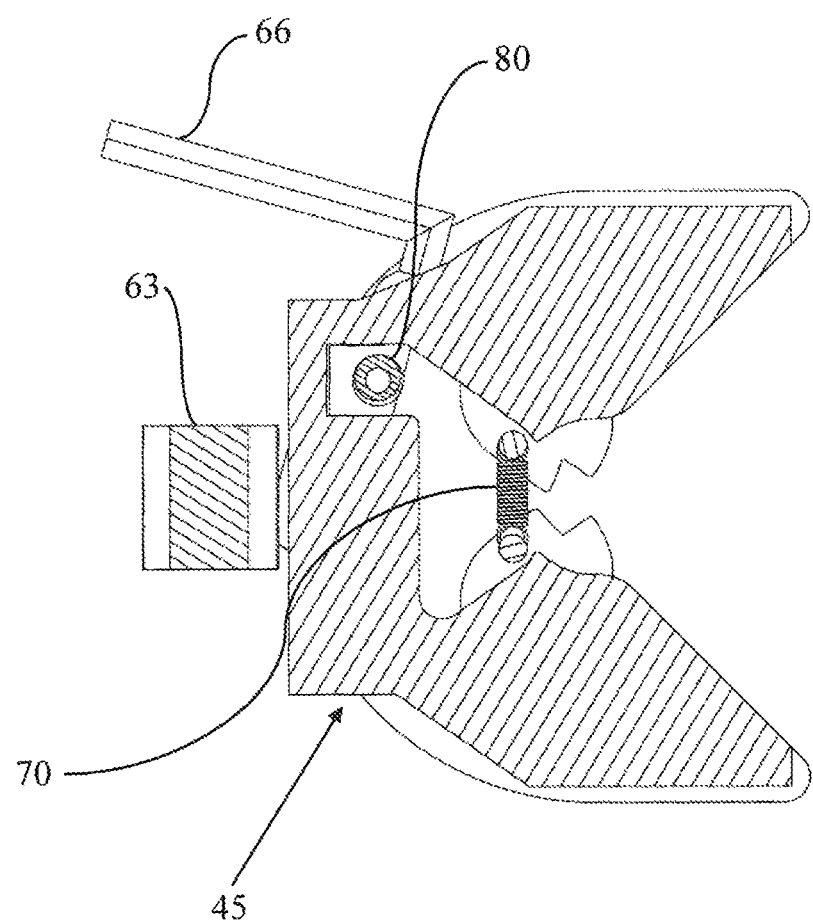
FIG. 27 is a partial cross-sectional view of the subassembly shown in FIG. 7 in the post-hitched state shown in FIG. 25 and taken along a segment of plane 27-27 of FIG. 25.
Figure 28:
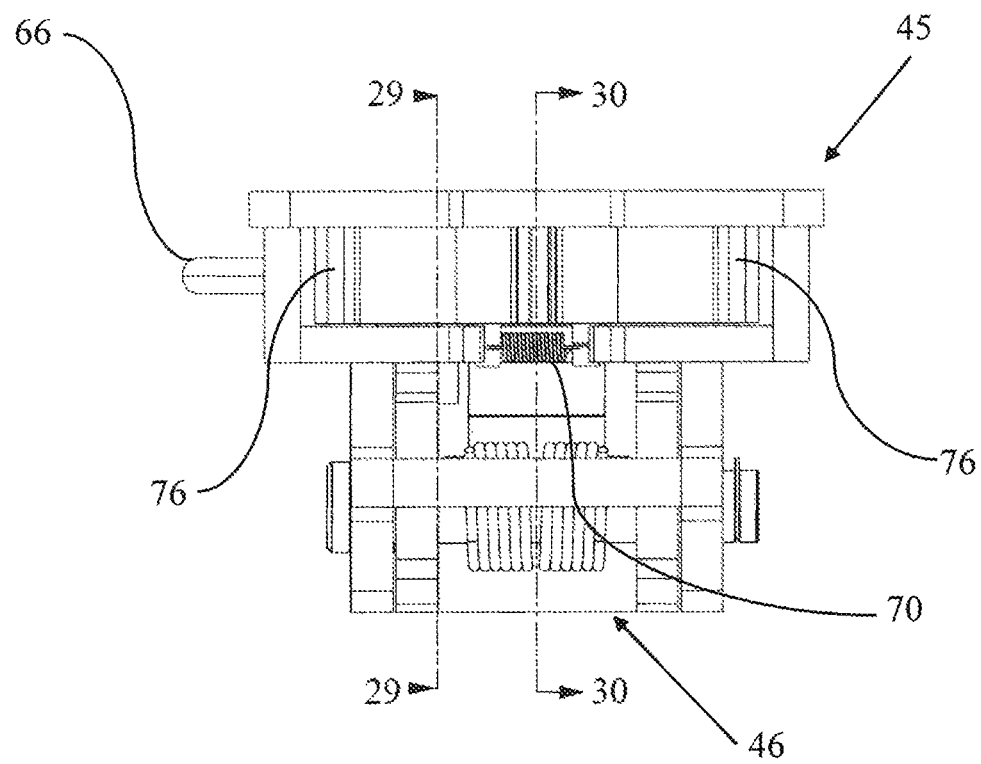
FIG. 28 is a front view of the subassembly shown in FIG. 7 in the post-hitched state shown in FIG. 25.
Figure 29:
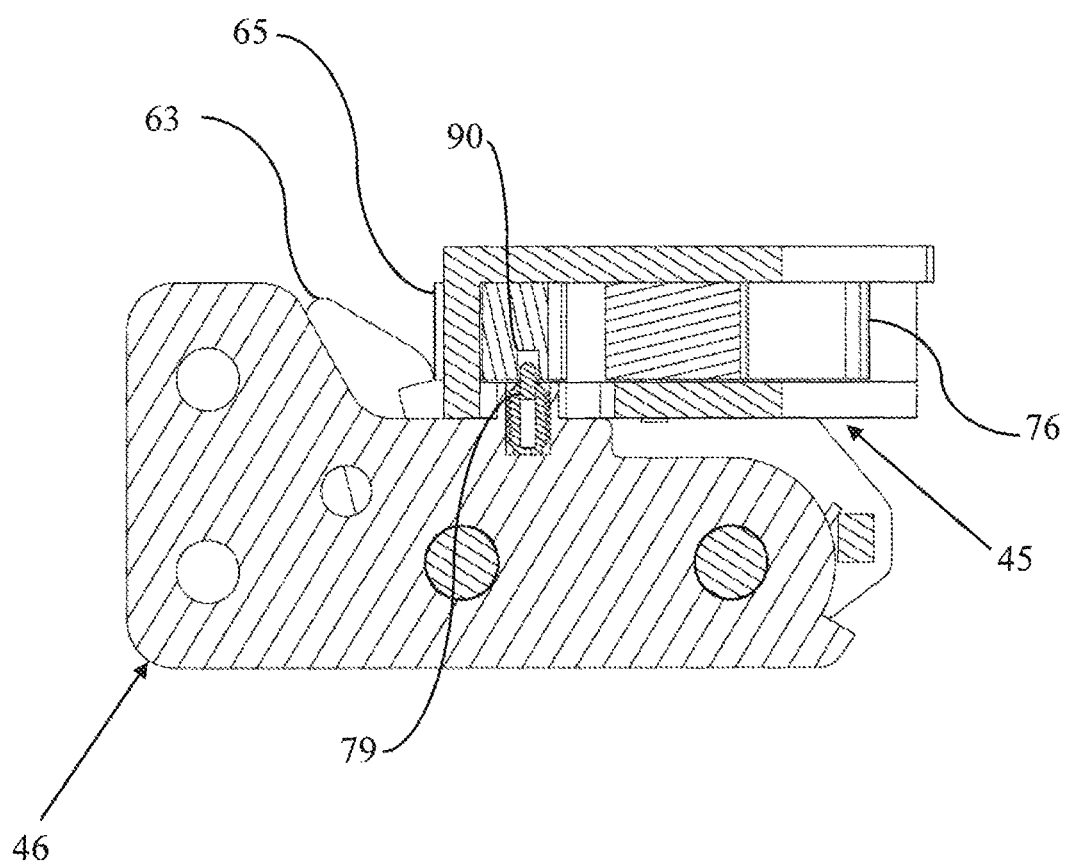
FIG. 29 is a cross-sectional view of the subassembly shown in FIG. 7 in the post-hitched state shown in FIG. 25 and taken along plane 29-29 of FIG. 28.
Figure 30:
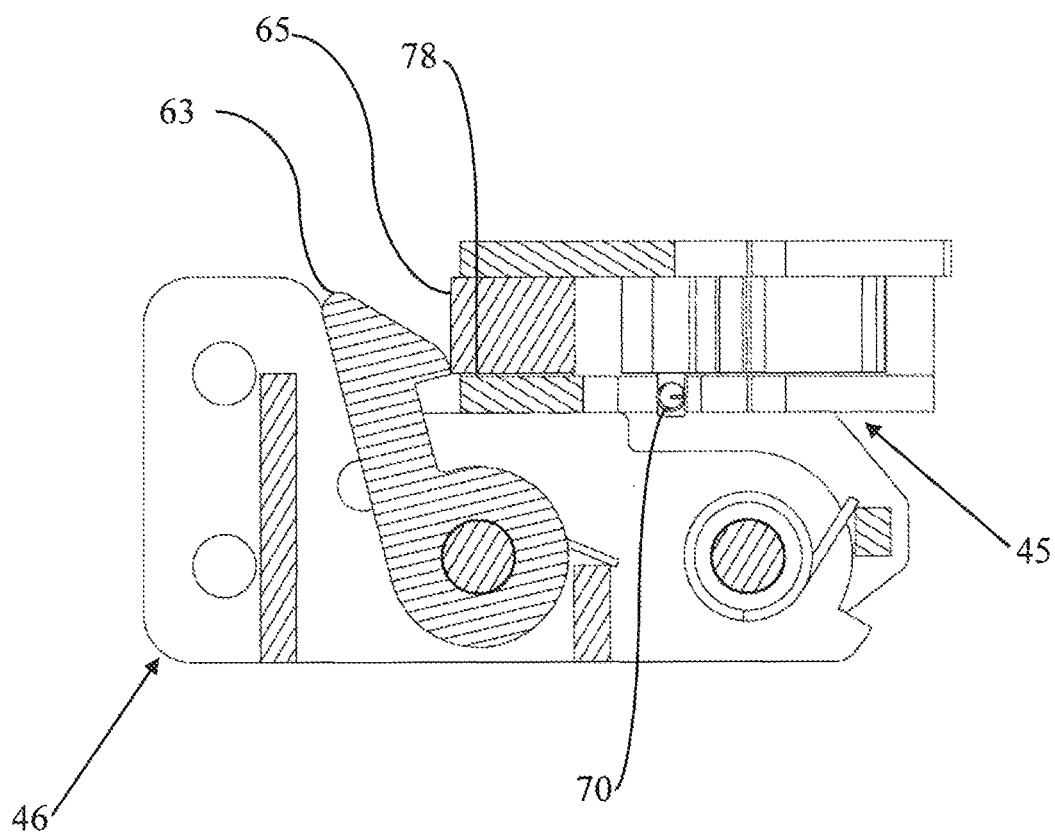
FIG. 30 is a cross-sectional view of the subassembly shown in FIG. 7 in the post-hitched state shown in FIG. 25 and taken along plane 30-30 of FIG. 28.
Figure 31:
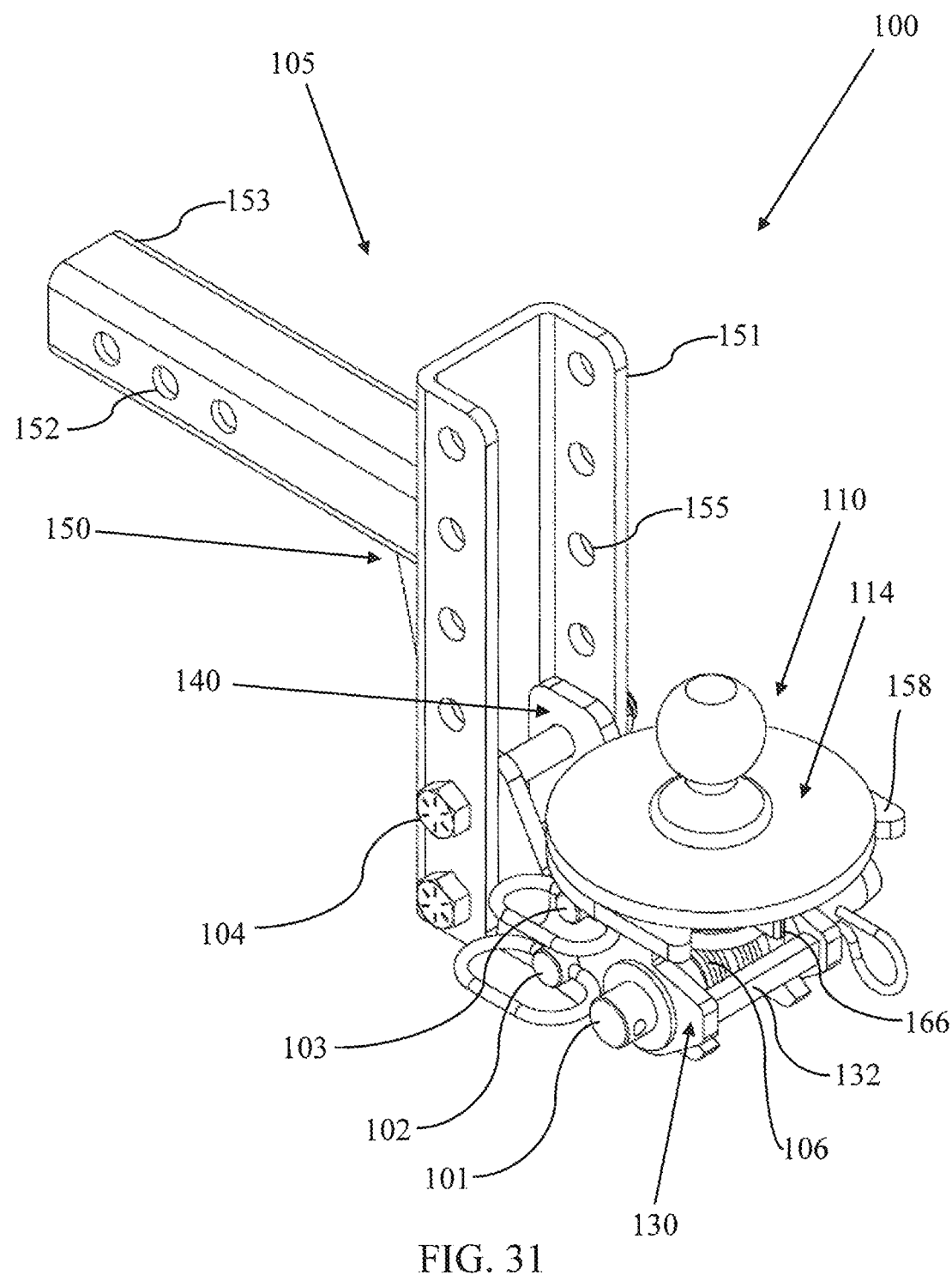
FIG. 31 is a front perspective view of another embodiment of a hitch.
Figure 32:
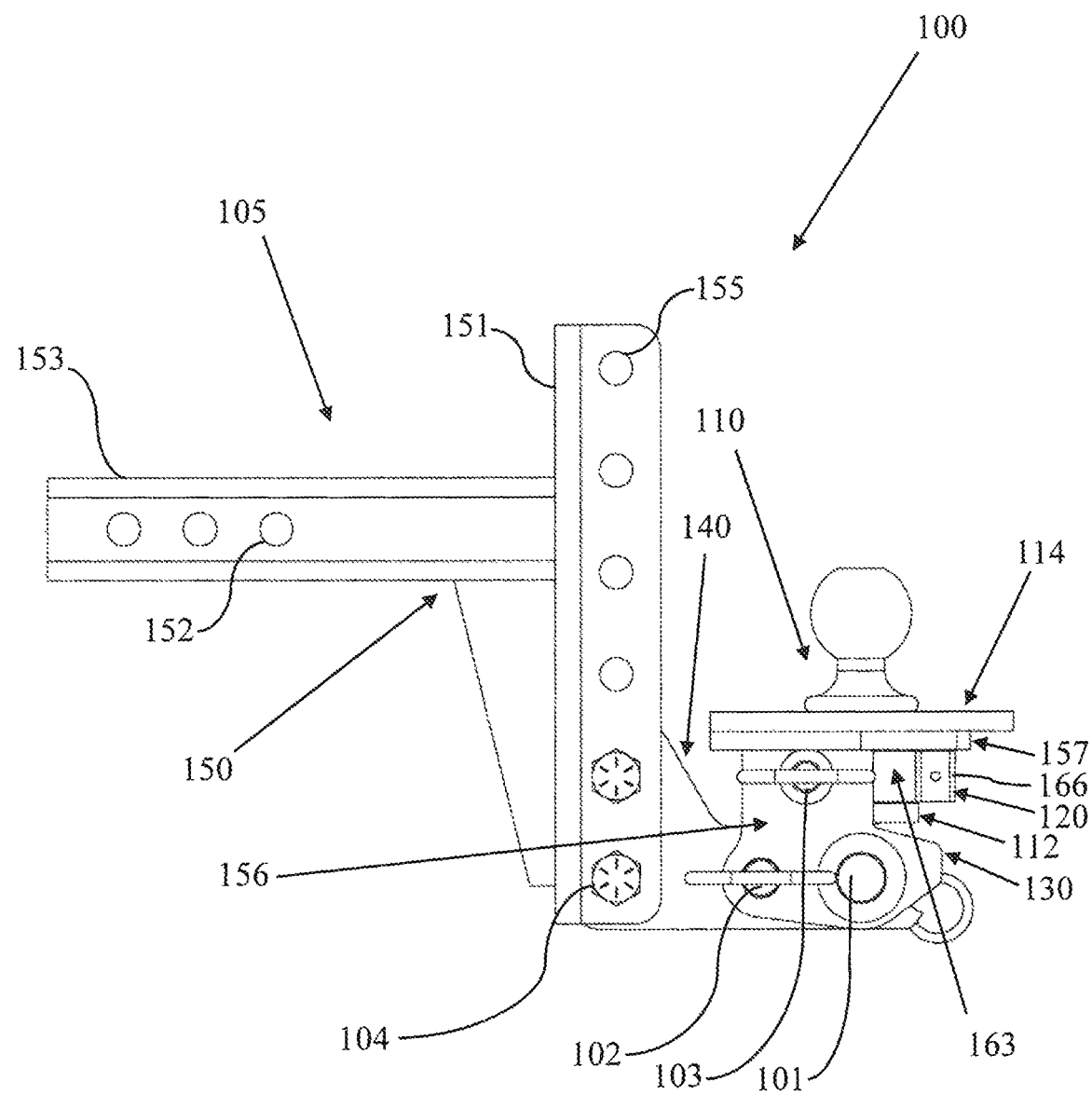
FIG. 32 is a side view of the hitch shown in FIG. 31.
Figure 33:
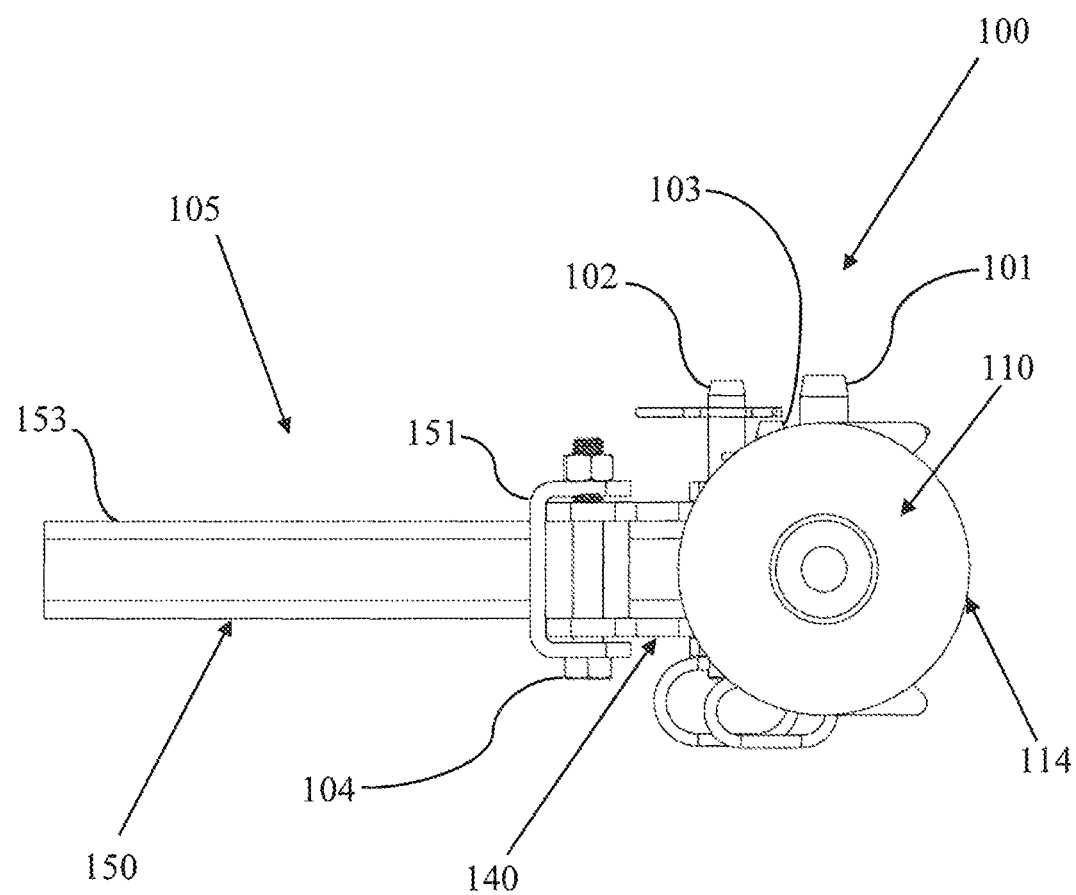
FIG. 33 is a top view of the hitch shown in FIG. 31.
Figure 34:
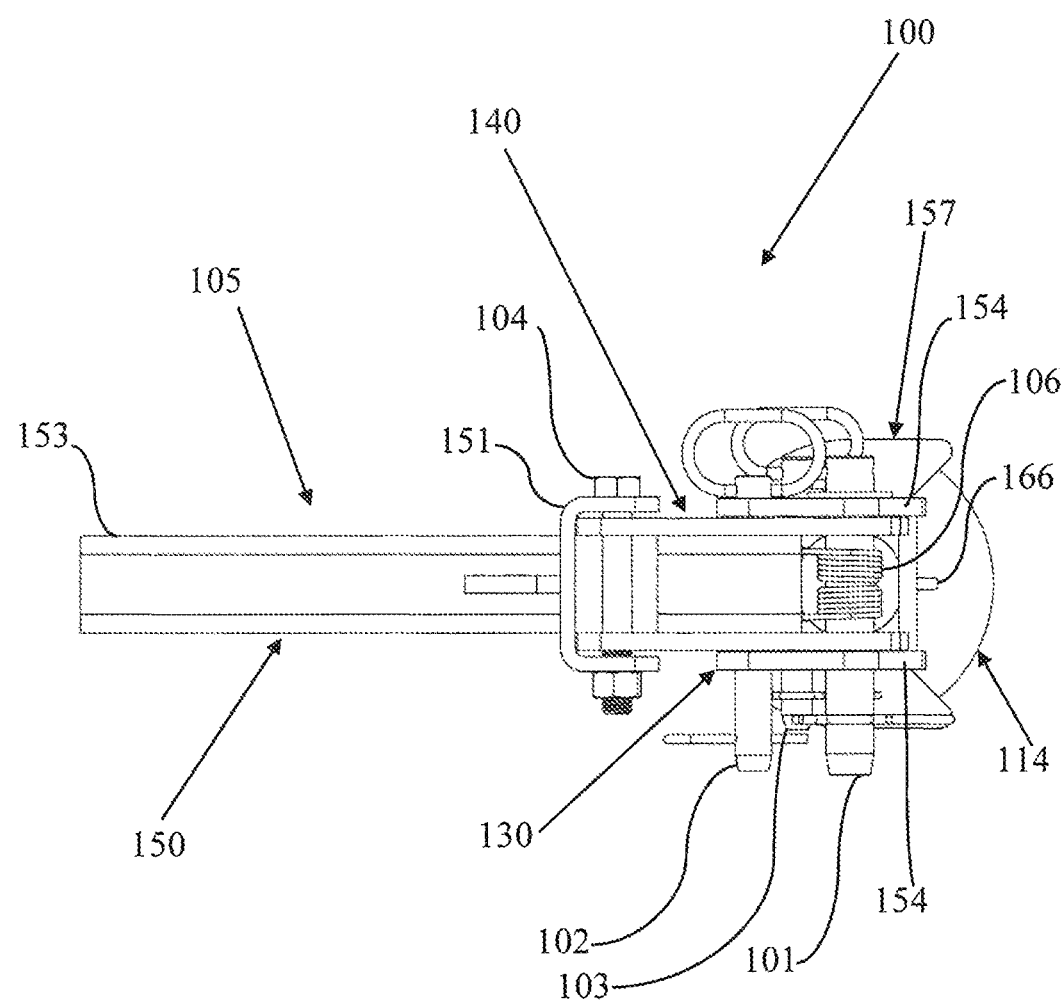
FIG. 34 is a bottom view of the hitch shown in FIG. 31.
Figure 35:
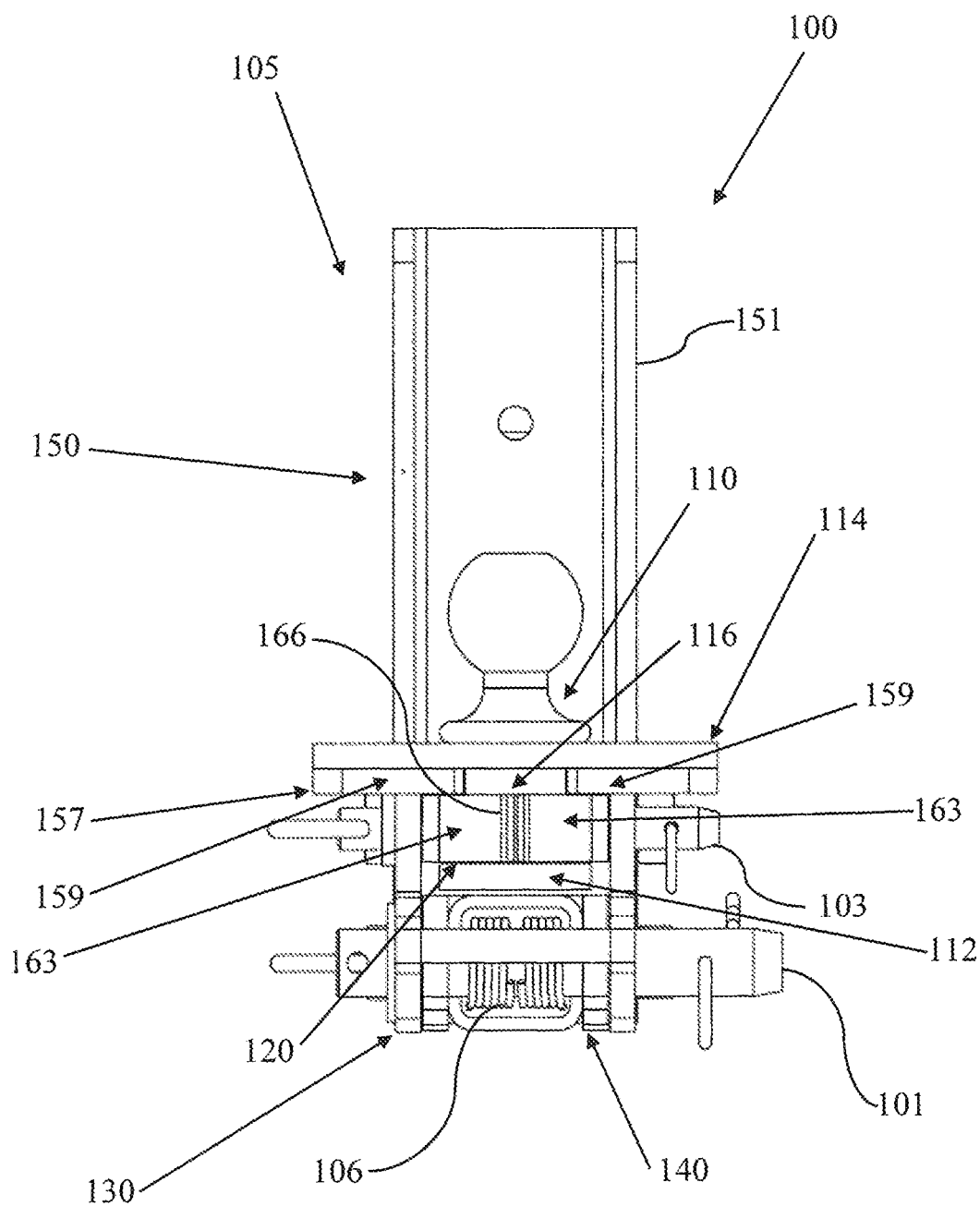
FIG. 35 is a front view of the hitch shown in FIG. 31.
Figure 36:
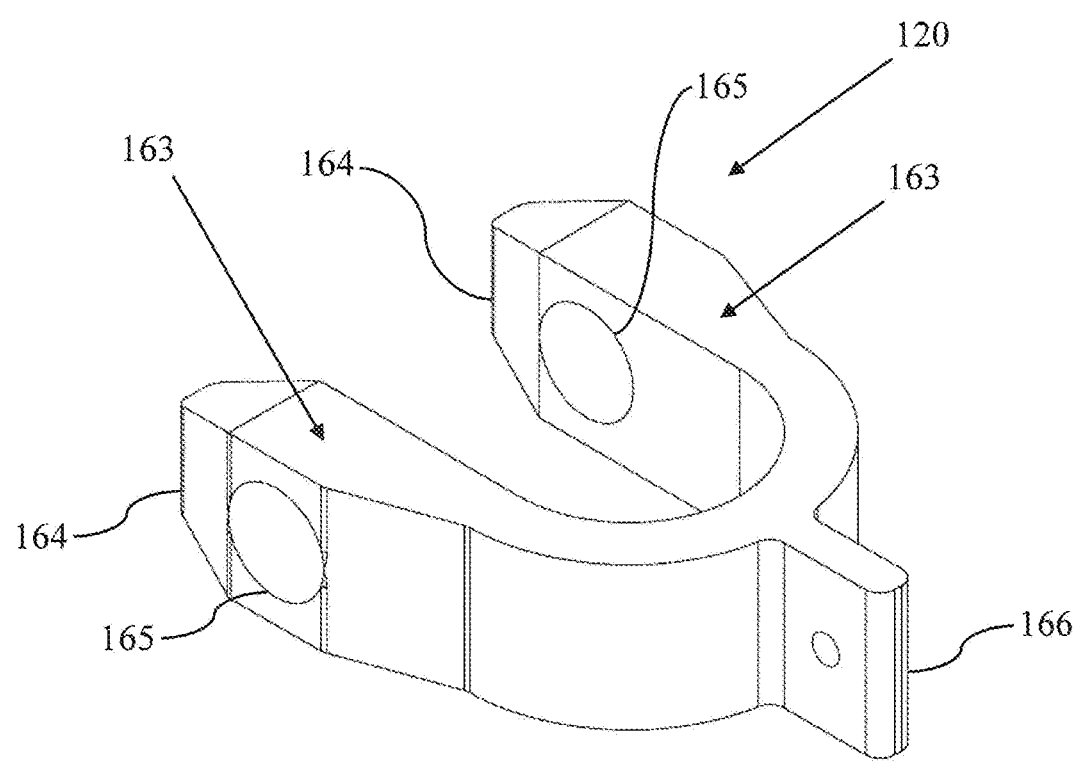
FIG. 36 is a front perspective view of a lock of the hitch shown in FIG. 31.
Figure 37:
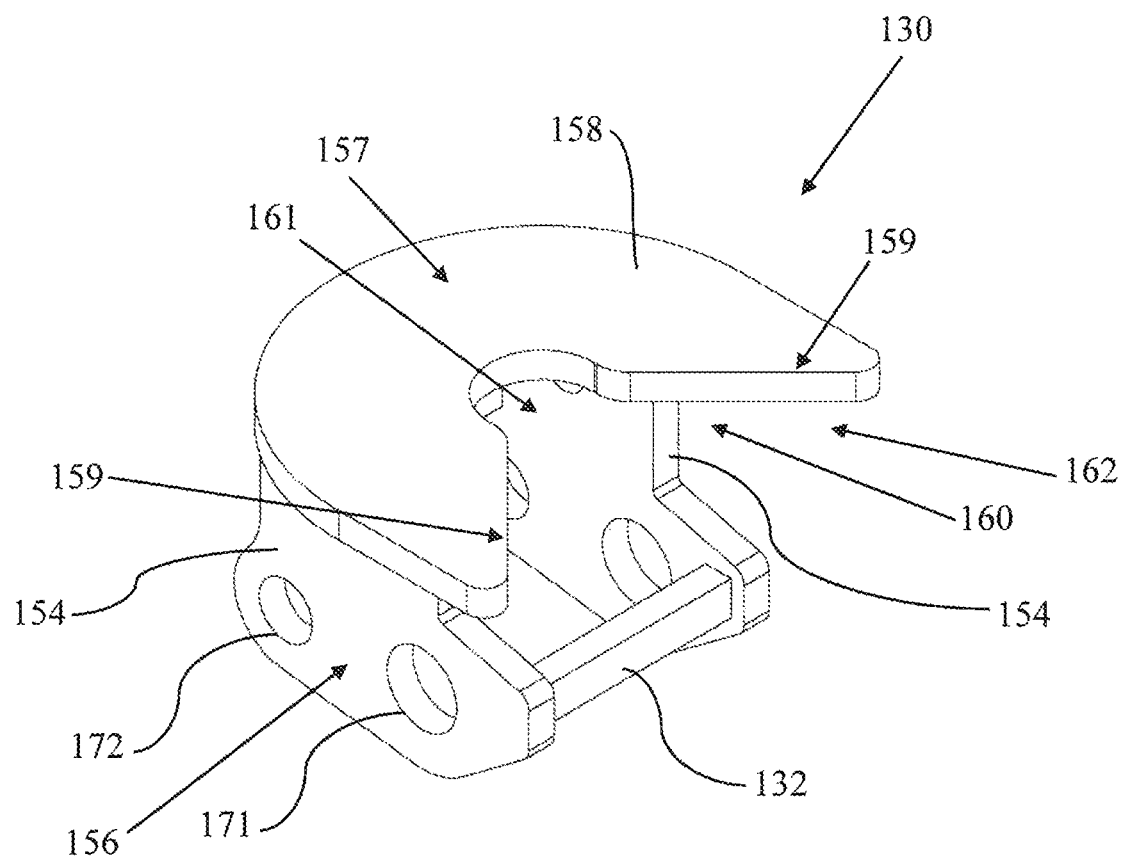
FIG. 37 is a front perspective view of an adapter alignment guide of the hitch shown in FIG. 31.
Figure 38:
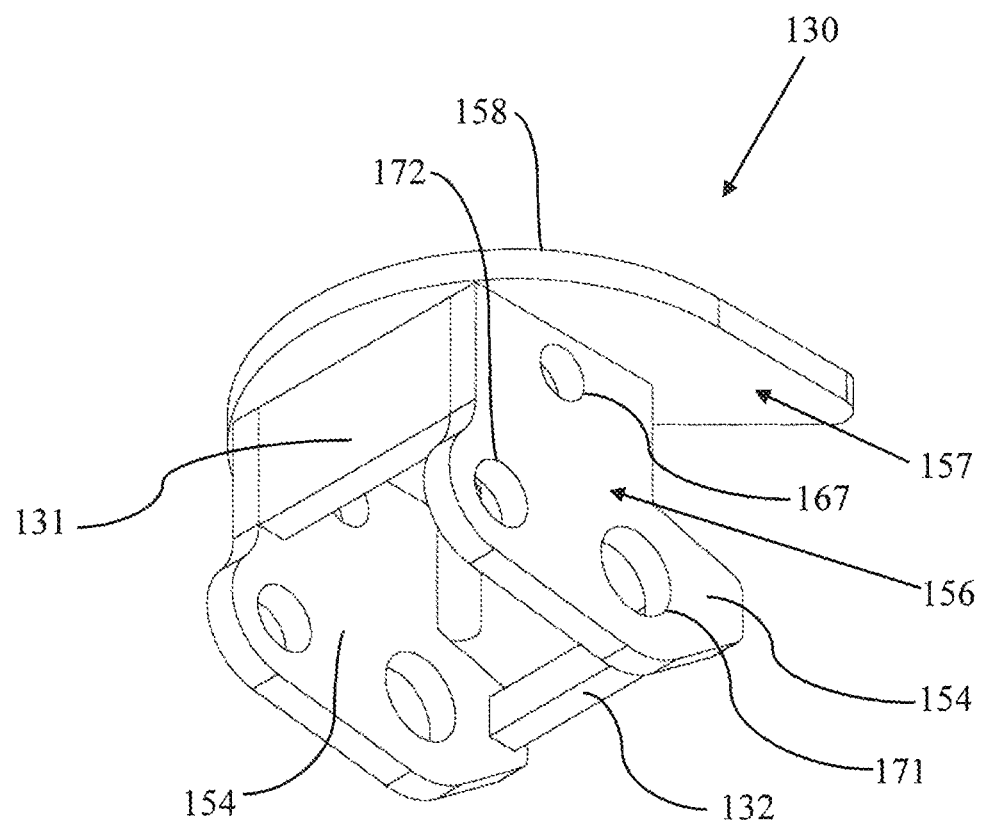
FIG. 38 is a back perspective view of the adapter alignment guide shown in FIG. 37.
Figure 39:
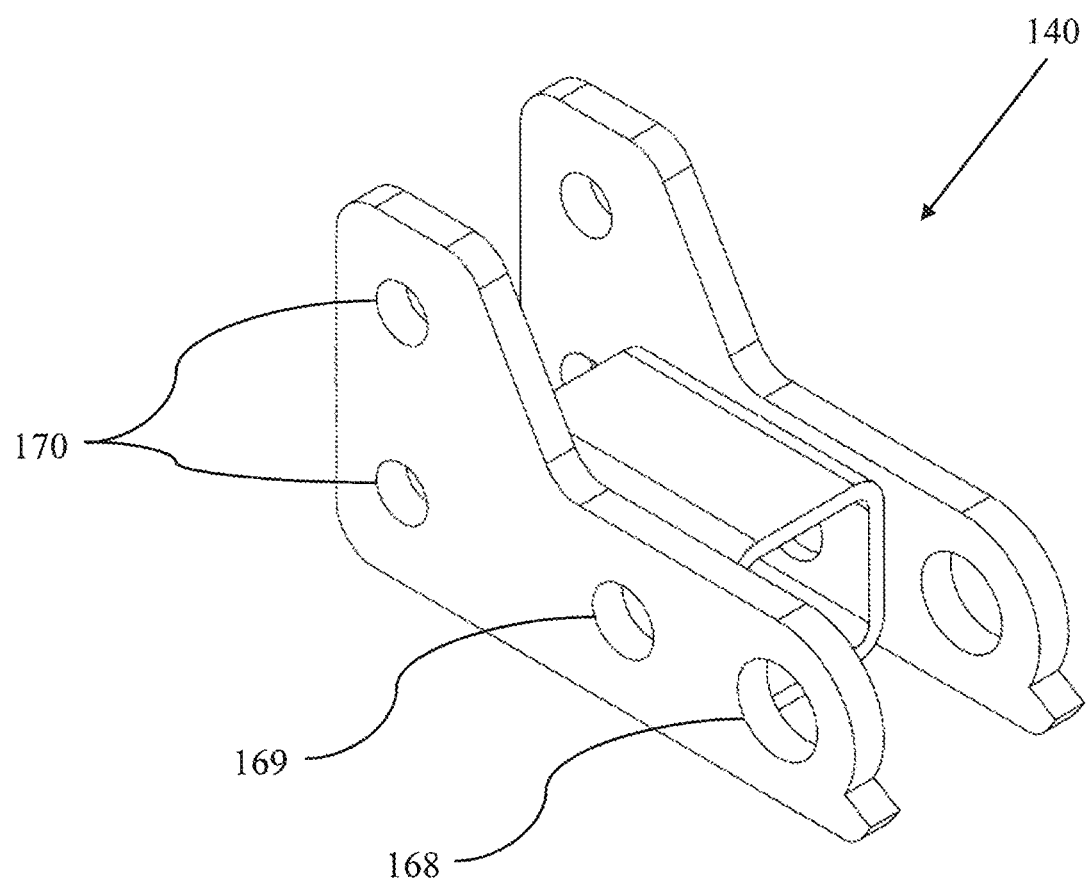
FIG. 39 is a front perspective view of a connecting coupler of the hitch shown in FIG. 31.

In the illustrated embodiment, lock 47 is in the form of a claw, which interacts with, among other structures, a hook 63, a retainer (e.g., a key 65), and a handle 66 to collectively make up aspects of a lock mechanism for securing ball adapter 110 to receiver adapter 40 as set forth in more detail below. Hook 63 is pivotably attached to coupler 46 via a pin 67 such that hook 63 is biased forward about pin 67 via a spring 68. Lock 47 includes a pair of fingers 69 each having a base 75 and a tip 76. Each finger 69 is pivotably disposed about a post 74, and fingers 69 are biased into an open position (as shown in FIG. 8) via a spring 70 such that inner surfaces 71 of fingers 69 define an opening 72 therebetween that is at least as wide as pathway 60 of body 54, wherein inner surfaces 71 of fingers 69 have cammed segments 73. Key 65 is positioned within body 54 behind fingers 69 and behind pocket 61, such that key 65 is displaceable toward and away from fingers 69 in a forward/backward direction via handle 66. Handle 66 is attached to key 65 and is pivotable about a post 80 within body 54 such that handle 66 extends outside of body 54 for manual operation of handle 66 to displace key 65 relative to fingers 69. In this manner, key 65 is movable relative to post 80 when hook 63 drives key 65 forward into gap 77 and when key 65 is manually withdrawn from gap 77 via handle 66, as set forth in more detail below. Notably, key 65 also has a recess 90 (shown in FIG. 23) sized to receive a spring-loaded detent 79 of coupler 46 to facilitate inhibiting key 65 from re-entering gap 77 after key 65 has been withdrawn from gap 77 via handle 66, as set forth in more detail below. In other embodiments, the lock may have any suitable structural configuration and relationship to other components of a lock mechanism that facilitates permitting the receiver adapter to function as described herein.

Figure 11:
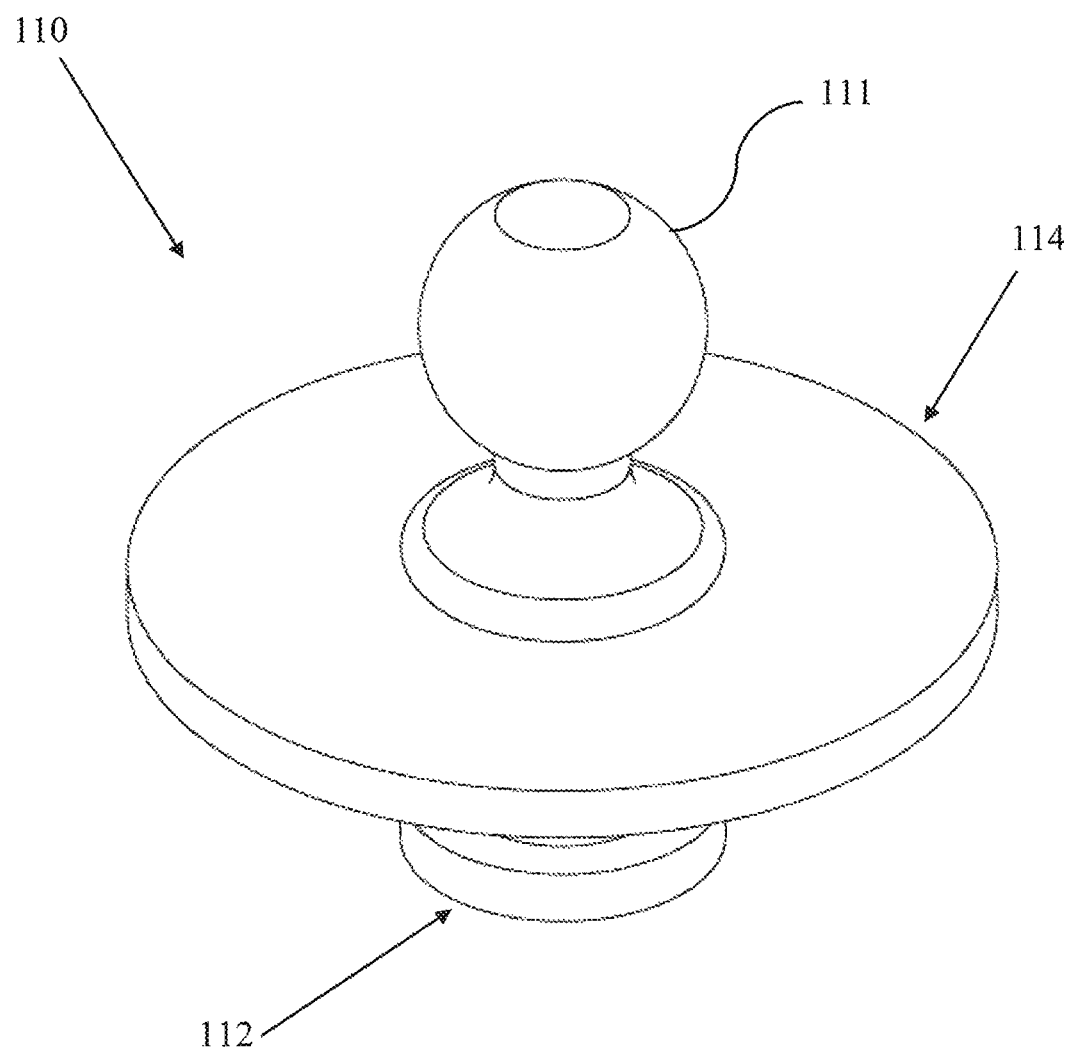
FIG. 11 is a perspective view of an embodiment of a hitch ball adapter in its pre-hitched state.
Figure 12:
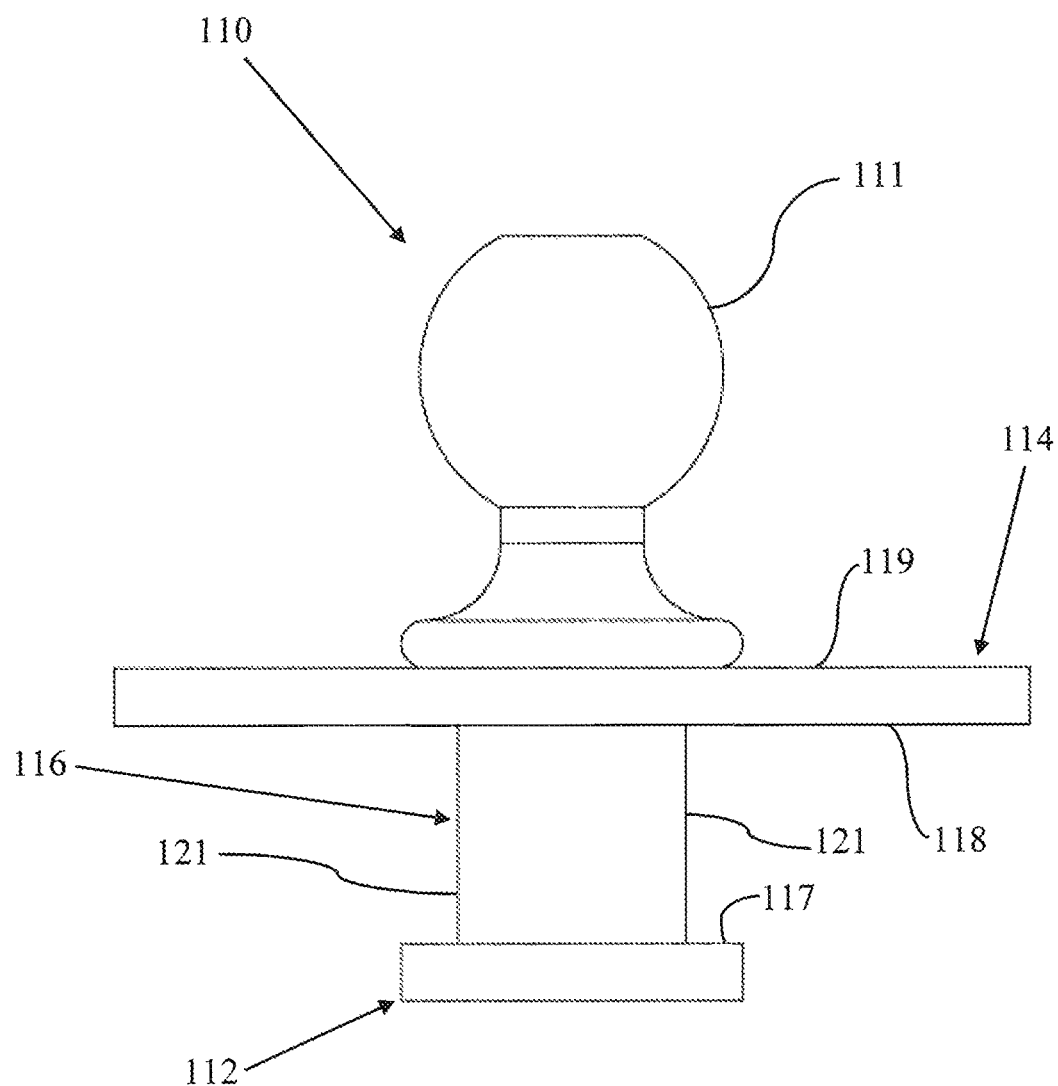
FIG. 12 is a side view of the hitch ball adapter shown in FIG. 11.
Figure 13:
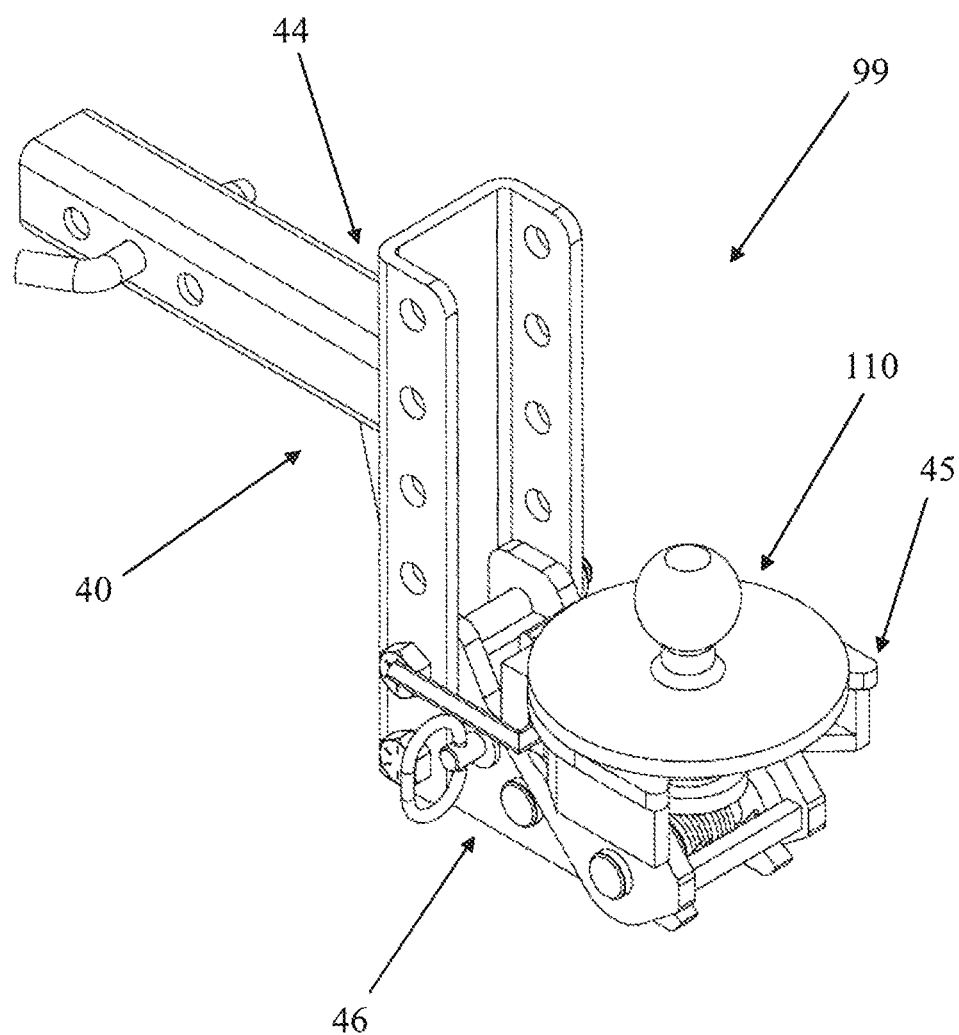
FIG. 13 is a front perspective view of an embodiment of a hitch including the hitch receiver adapter shown in FIG. 1 and the hitch ball adapter shown in FIG. 11 in their hitched states.
Figure 14:
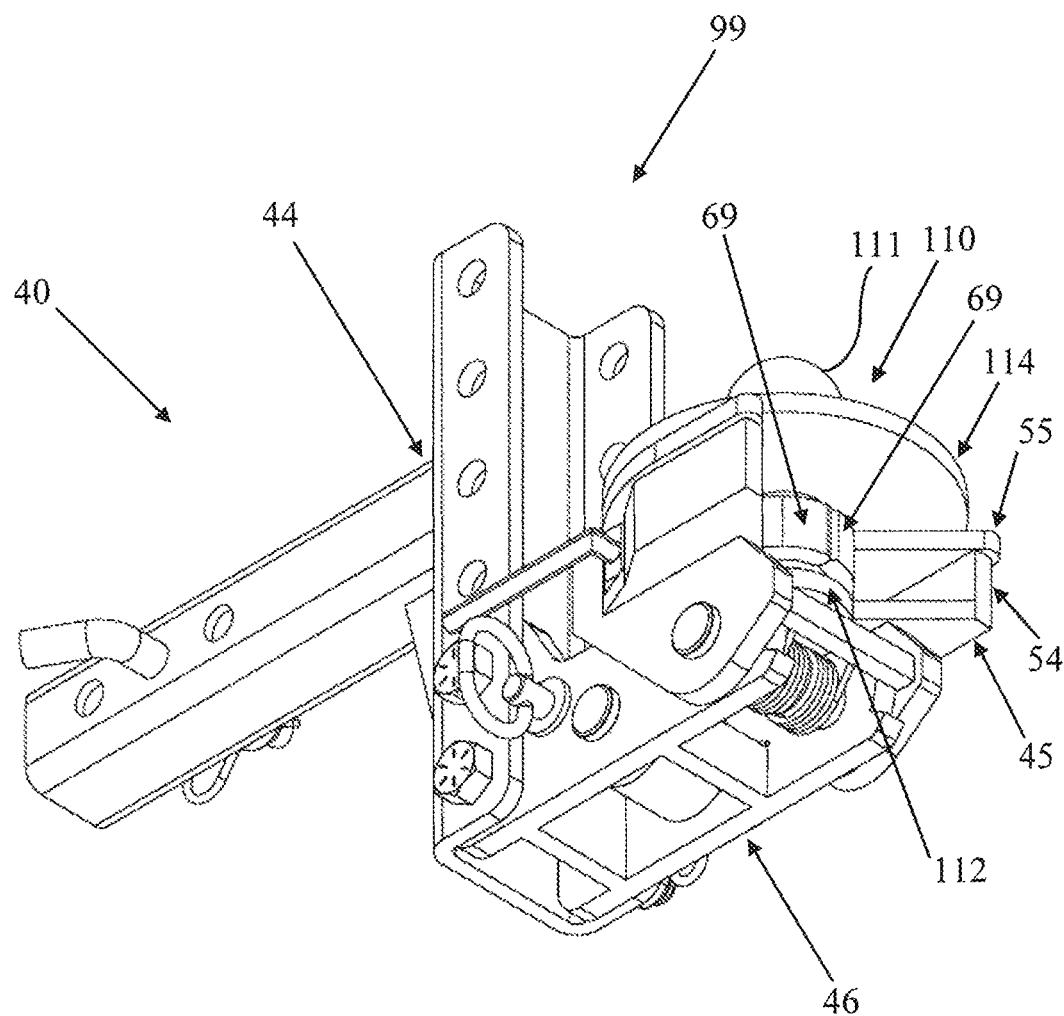
FIG. 14 is a bottom perspective view of the hitch shown in FIG. 13.
Figure 15:
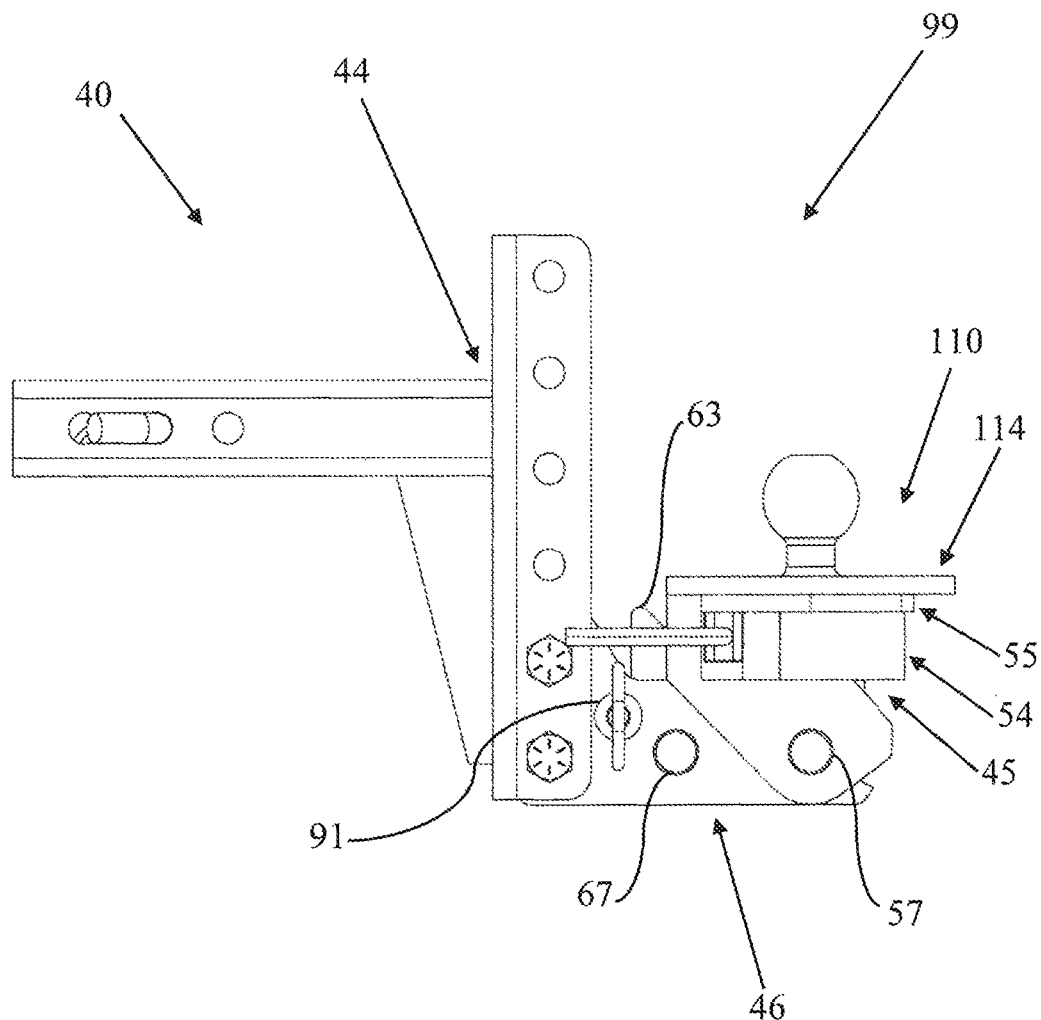
FIG. 15 is a side view of the hitch shown in FIG. 13.
Figure 16:
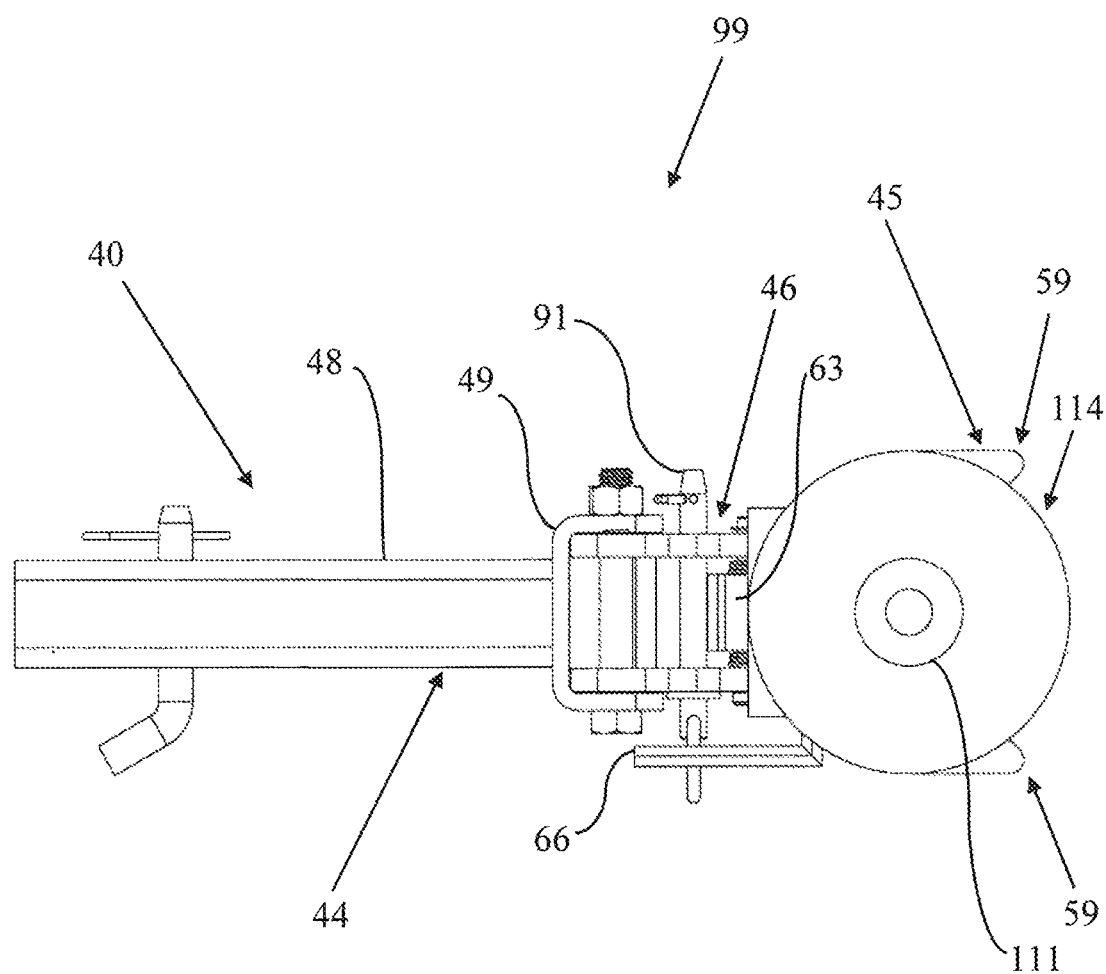
FIG. 16 is a top view of the hitch shown in FIG. 13.
Figure 17:
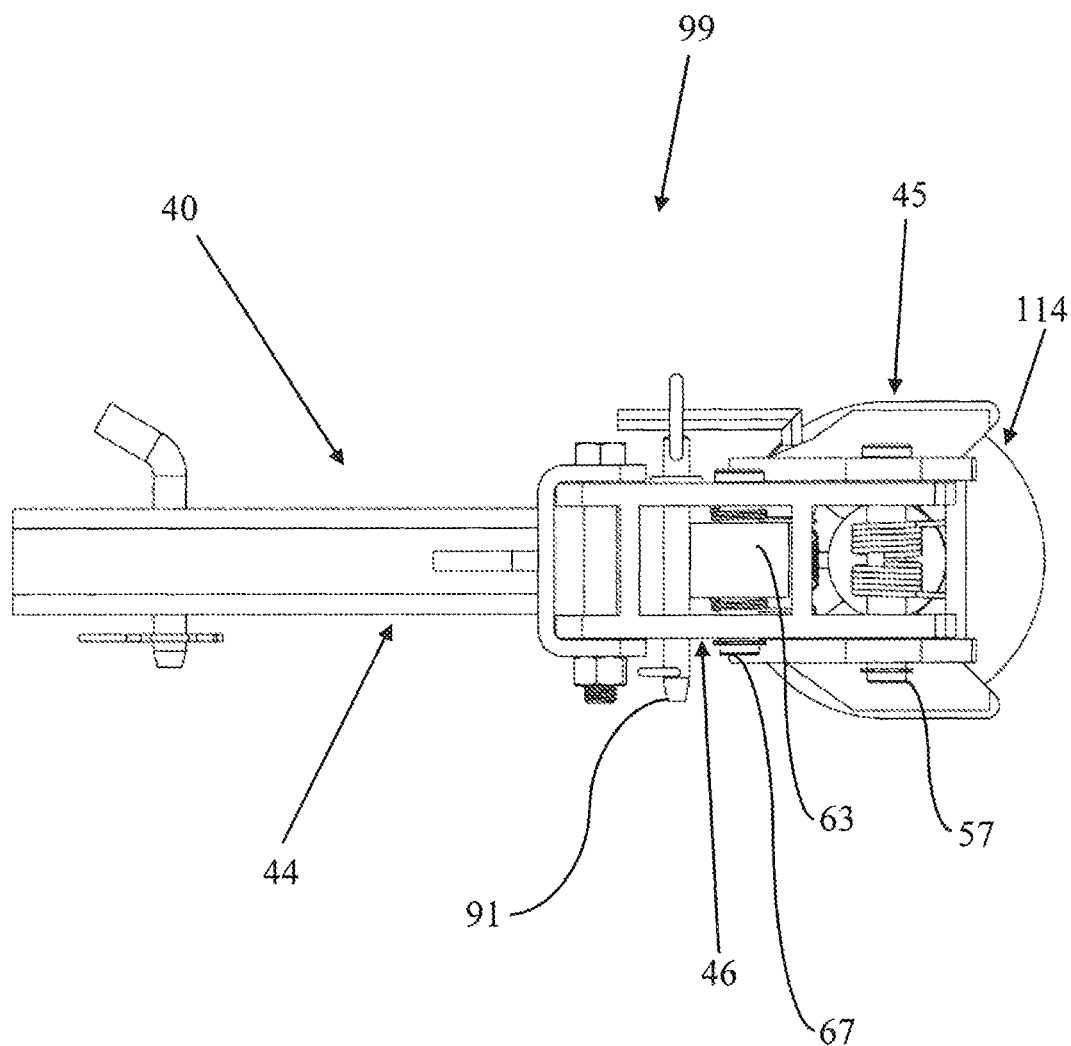
FIG. 17 is a bottom view of the hitch shown in FIG. 13.
Figure 18:
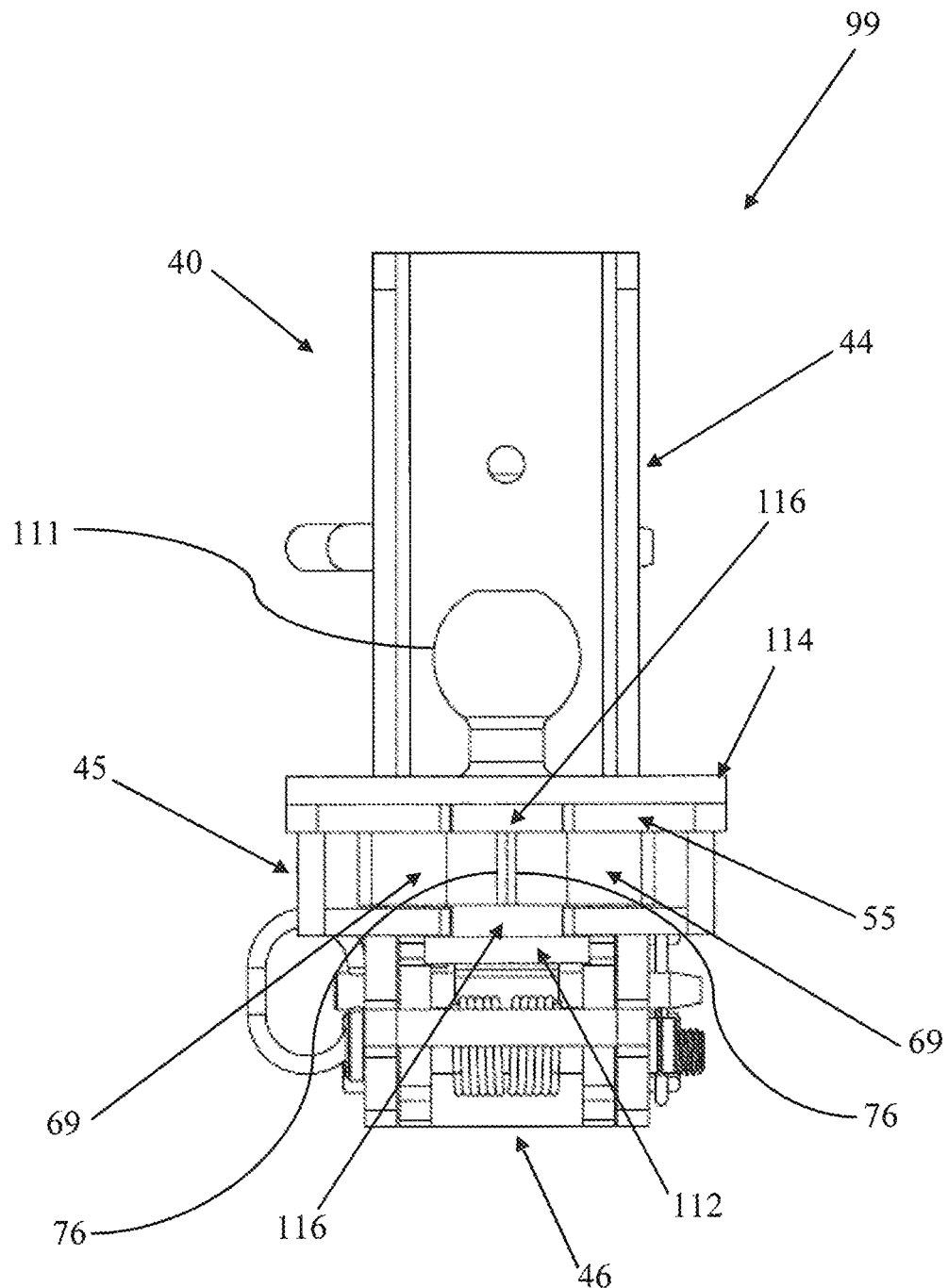
FIG. 18 is a front view of the hitch shown in FIG. 13.
Figure 19:
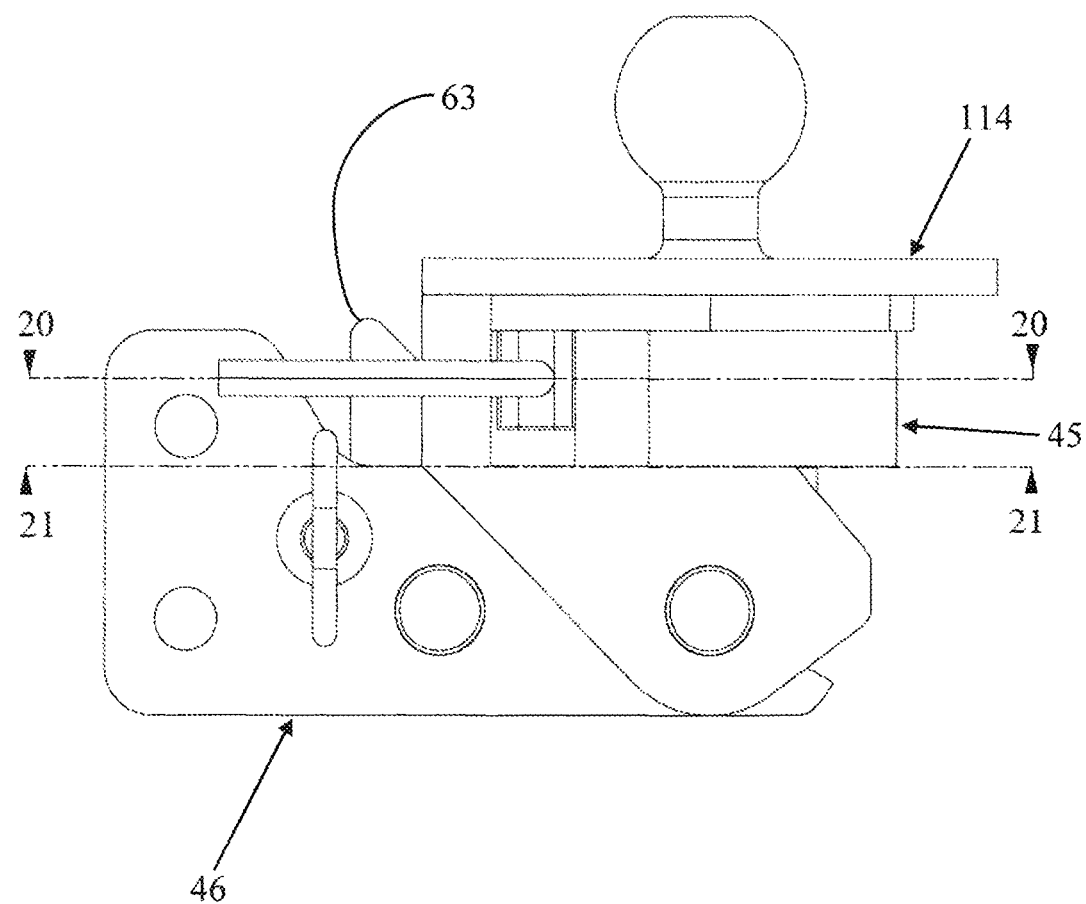
FIG. 19 is a side view of a subassembly of the hitch shown in FIG. 13.
Figure 20:
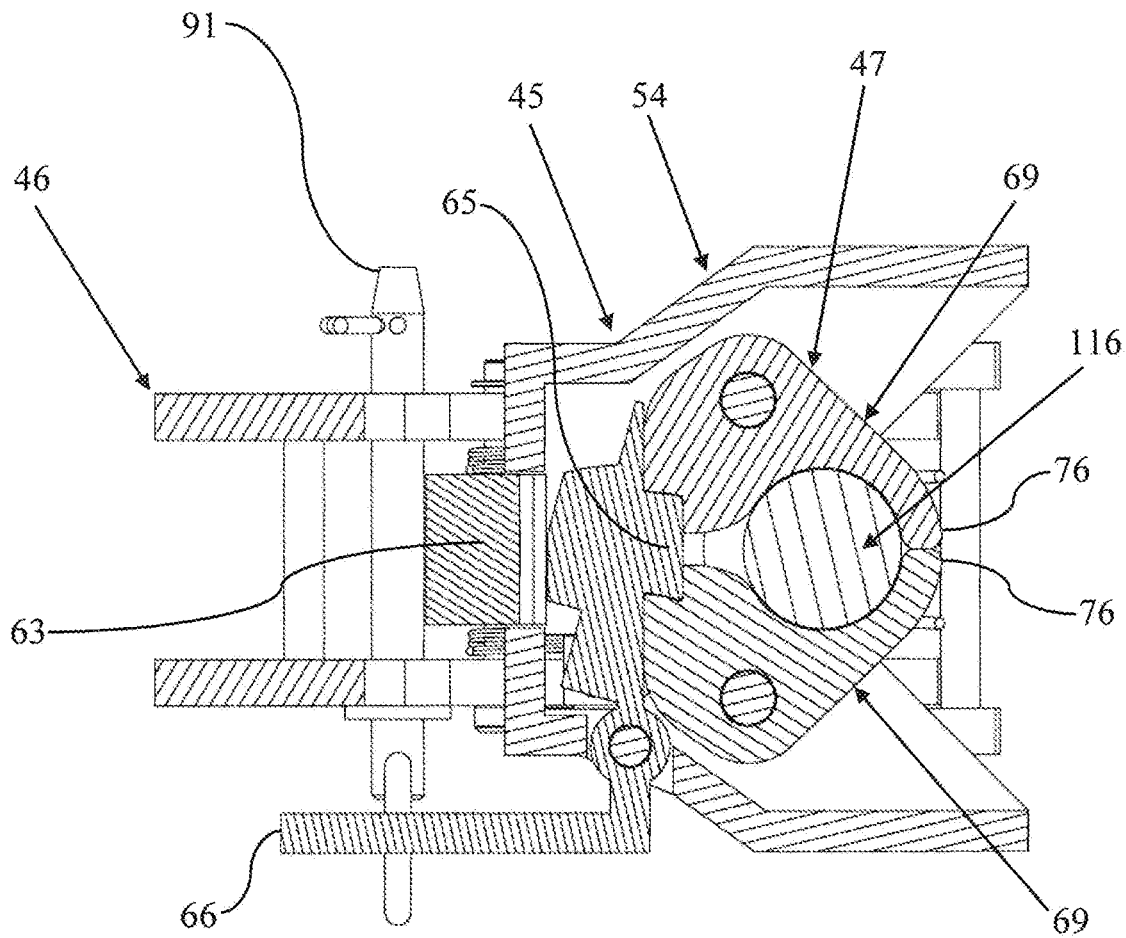
FIG. 20 is a cross-sectional view of the subassembly shown in FIG. 19 taken along plane 20-20 of FIG. 19.
Figure 21:
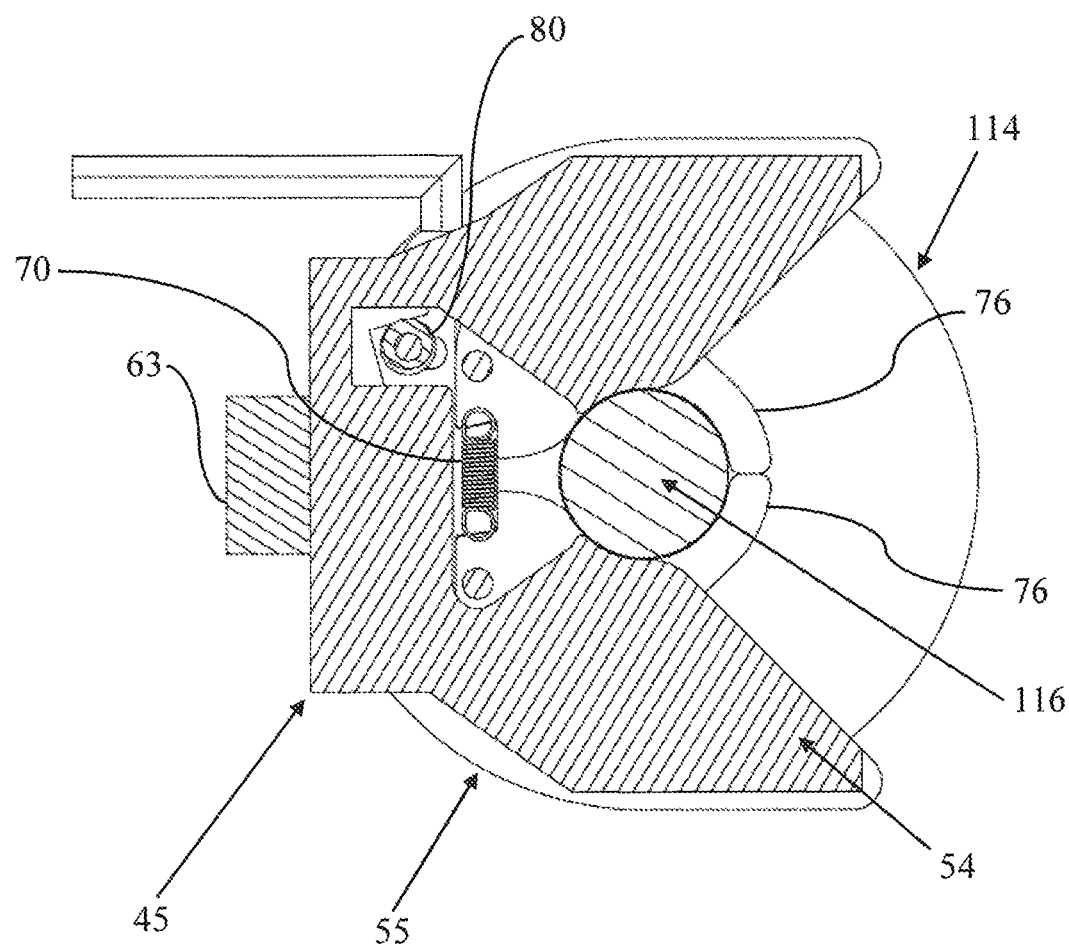
FIG. 21 is a partial cross-sectional view of the subassembly shown in FIG. 19 taken along a segment of plane 21-21 of FIG. 19.
Figure 22:
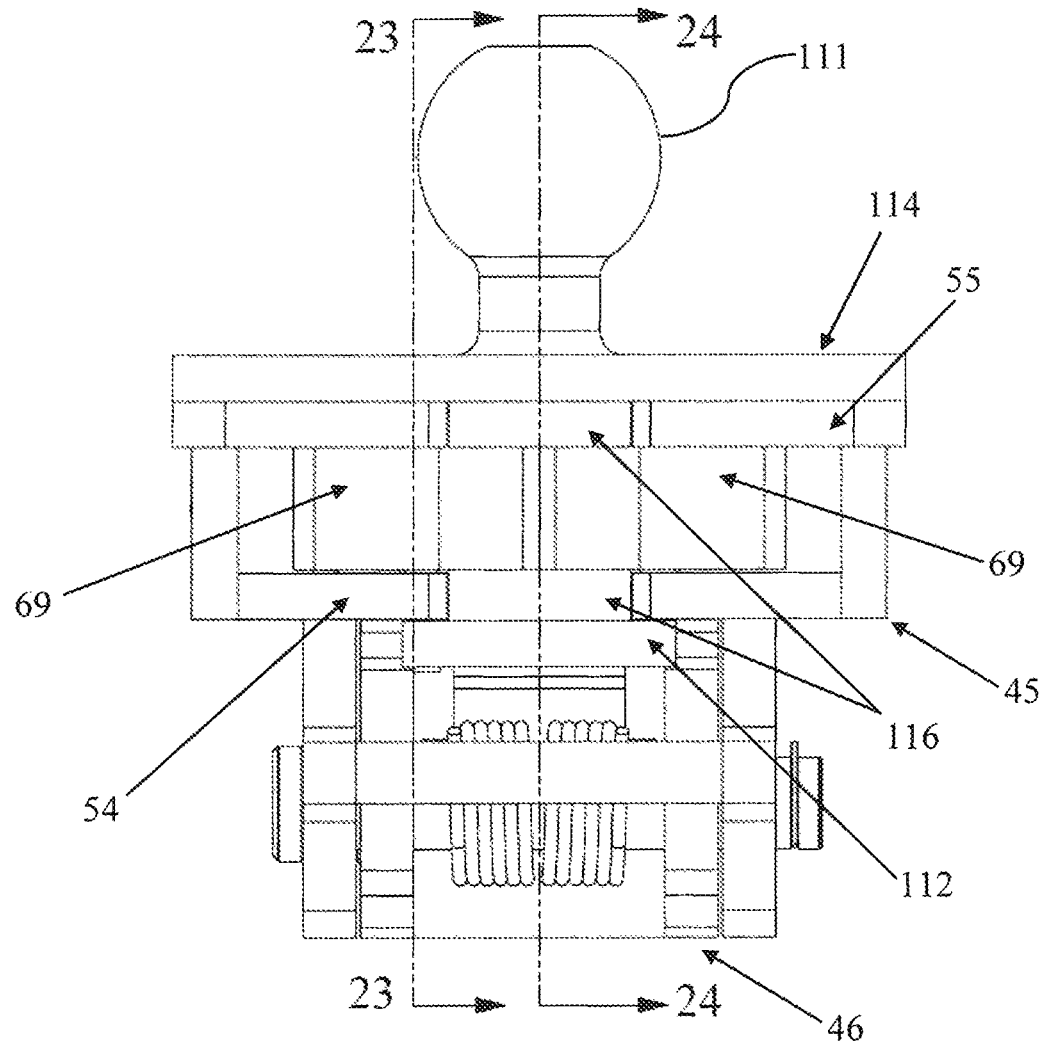
FIG. 22 is a front view of the subassembly shown in FIG. 19.

With reference now to FIGS. 11 and 12, a hitch ball adapter 110 is illustrated in its pre-hitched state. In the illustrated embodiment and state, hitch ball adapter 110 is insertable into the tongue of a trailer to facilitate towing the trailer using a vehicle to which receiver adapter 40 is attached, as set forth in more detail below. In the illustrated embodiment, hitch ball adapter 110 includes: a bottom plate 112; a top plate 114; a king pin rod 116 extending between an upper surface 117 of bottom plate 112 and a lower surface 118 of top plate 114; and a ball 111 extending from an upper surface 119 of top plate 114. Plates 112, 114 are disc-shaped, and rod 116 is cylindrical in shape such that rod 116 has linear side profiles 121. In another embodiment, rod 116 may have side profiles that are not linear (e.g., rod 116 may have side profiles that together give rod 116 an hourglassshaped curvature). Alternatively, rod 116 and plates 112, 114 may have any suitable contours that facilitate permitting the ball adapter to function as described herein.

With reference now to FIGS. 13-30, receiver adapter 40 and ball adapter 110 are illustrated in their hitched state (i.e., a state in which receiver adapter 40 engages ball adapter 110 to form a hitch 99 that facilitates towing a trailer using a vehicle). Receiver adapter 40 and ball adapter 110 are attachable to their respective vehicle and trailer (and to one another to form hitch 99) in the following manner. Ball adapter 110 is attached to the trailer by inserting ball 111 into the tongue of the trailer and then engaging a latch of the tongue, for example, to secure ball 111 within the tongue and elevated above the ground, such that plates 112, 114 and rod 116 are suspended from the tongue of the trailer. Either before or after ball adapter 110 is attached to the trailer, receiver adapter 40 is attached to the towing frame of the vehicle by inserting tube 48 into the socket of the towing frame and inserting pin 51 through the socket and through a pair of corresponding holes 50 of tube 48 to retain tube 48 within the socket at a desired length of extension from the socket. Either before or after inserting tube 48 into the socket of the vehicle's towing frame, coupler 46 may be adjusted upward or downward along channel 49 by inserting bolts 53 into corresponding holes 52 to suit a desired height of coupler 46 relative to the ground. Notably, in this pre-hitched state of receiver adapter 40, guide 45 is biased into its oblique orientation relative to the ground via spring 58 and is ready to receive rod 116 of hitch ball adapter 110.

After attaching receiver adapter 40 to the vehicle and ball adapter 110 to the trailer, the vehicle may be driven in reverse toward the trailer such that guide 45 of receiver adapter 40 approaches rod 116 of ball adapter 110 and such that rails 59 of guide 45 facilitate directing rod 116 along pathway 60 and into pocket 61. As rod 116 is directed along pathway 60, top plate 114 of ball adapter 110 engages and slides along top plate 55 of guide 45 to cause guide 45 to pivot backward against the bias of spring 58, thereby lifting ball adapter 110 (and, thus, the tongue of the trailer) farther away from the ground. When rod 116 is ultimately situated within pocket 61, plates 55, 114 are seated face-to-face against one another in substantially parallel relation to the ground. Notably, as rod 116 approaches pocket 61 within pathway 60, rod 116 contacts cammed segments 73 of fingers 69, thereby progressively converting the horizontal motion of rod 116 within pathway 60 into rotational motion of fingers 69 about posts 74 such that tips 76 of fingers 69 pivot toward one another and such that bases 75 of fingers 69 pivot away from one another against the bias of spring 70 to enlarge the size of gap 77 between bases 75 of fingers 69. As bases 75 of fingers 69 are pivoted away from one another, guide 45 pivots backward against spring 58, and hook 63 clips onto a ledge 78 of body 54 such that guide 45 is retained against forwardly pivoting relative to coupler 46 and such that hook 63 contacts key 65 and drives key 65 forward into gap 77 between bases 75 of fingers 69 to fix fingers 69 in place relative to one another.

In this position, fingers 69 together wrap partly around rod 116, with key 65 and fingers 69 together enveloping—or surrounding—an entire circumference (or perimeter) of rod 116 to facilitate securing rod 116 in place relative to receiver adapter 40. Additionally, body 54 nearly spans from bottom plate 112 to top plate 55 along rod 116 to further facilitate securing rod 116 in place relative to receiver adapter 110. With rod 116 secured in this manner, a pin 91 is inserted through coupler 46 behind hook 63 to facilitate preventing hook 63 from pivoting backward (and, thus, to facilitate preventing the withdrawal of key 65 from gap 77). With pin 91 inserted through coupler 46 in this manner, receiver adapter 40 is securely hitched to ball adapter 110 to form hitch 99 by which the trailer is ready for towing from one location to another using the vehicle.

In order to detach the trailer from the vehicle (e.g., after relocating the trailer using hitch 99), pin 91 is removed from coupler 46, and handle 66 is then pivoted forward to displace key 65 away from fingers 69, out of gap 77, and off of ledge 78. In this condition, the vehicle may be driven away from the trailer, such that rod 116 disengages cammed segments 73 of fingers 69 to permit spring 70 to rotate bases 75 of fingers 69 toward one another—and tips 76 of fingers 69 away from one another—to allow rod 116 to fully exit pathway 60 and to permit guide 45 to again pivot forward under the bias of spring 58, thereby detaching ball adapter 110 from receiver adapter 40. As key 65 is withdrawn backward and out of gap 77 via handle 66, recess 90 of key 65 comes into alignment with detent 79 of coupler 46 such that detent 79 is biased upward into recess 90, thereby inhibiting key 65 from reentering gap 77. Hitch receiver adapter 40 is then in its post-hitched state (as shown in FIGS. 25-30). In such a state, as rod 116 exits pathway 60 when the vehicle drives away from the trailer, guide 45 is permitted to progressively pivot forward under the influence of spring 58, thereby lifting recess 90 away from detent 79 and permitting key 65 to again move forward within body 54. With guide 45 again pivoted fully forward, receiver adapter 40 has transitioned into its pre-hitched state shown in FIGS. 1-10, such that hitch receiver adapter 40 is again ready for attachment to another (or the same) hitch ball adapter 110 and associated trailer in the same manner as set forth above.

FIGS. 31-39 illustrate another embodiment of a hitch 100 for use in towing a trailer using a vehicle. In the illustrated embodiment, hitch 100, in some respects, is structured and operates like hitch 99, and hitch 100 includes a hitch receiver adapter 105 attachable to hitch ball adapter 110. In the same manner as that set forth above for hitch 99, hitch ball adapter 110 of hitch 100 is removably attachable to the tongue of a trailer, and receiver adapter 105 of hitch 100 is removably attachable to a receiver socket of a towing frame of a vehicle to facilitate towing a trailer from the vehicle. Also, receiver adapter 105, like receiver adapter 40 set forth above, has components and associated structures that are relatively located and moveable in front-to-back and top-to-bottom directions.

In the illustrated embodiment, receiver adapter 105 includes: an adjustable hitch receiver 150; and an adapter alignment guide 130 attached to adjustable hitch receiver 150 via a connecting coupler 140 and via adapter collar lock 120. Adjustable hitch receiver 150 serves as a mount (or a bracket) by which receiver adapter 105 is coupled to the towing frame of a vehicle, and connecting coupler 140 serves as a base (or a support) upon which guide 130 is seated. Adjustable hitch receiver 150 includes a tube 153 sized for insertion into the receiver socket of the vehicle's towing frame, and a channel 151 that is connected to tube 153 in substantially perpendicular relation thereto such that, when tube 153 is inserted into the receiver socket, tube 153 is oriented substantially parallel to the ground while channel 151 is oriented substantially perpendicular to the ground. Tube 153 has a plurality of holes 152 for fixing tube 153 within the receiver socket of the towing frame at a desired length of extension from the socket via a pin. Channel 151 also has a plurality of holes 155 for fixing coupler 140 to channel 151 at a desired height above the ground via a plurality of bolts 104 insertable into holes 170 of coupler 140.

In the illustrated embodiment, guide 130 includes a hollow body 156 having a pair of side plates 154, a top plate 157, a back support stop plate 131, and a front support stop plate 132. Body 156 is pivotably attached to coupler 140 via a pin 101 inserted through holes 171 of guide 130 and holes 168 of coupler 140 such that guide 130 is biased forward about pin 101 via a spring 106 to obliquely orient plate 157 relative to the ground. Guide 130 contacts coupler 140 at plates 131, 132 during pivoting to facilitate limiting the range within which guide 130 is permitted to pivot forward and backward about pin 101 (e.g., the forward pivoting of guide 130 is limited to when a top surface 158 of top plate 157 is oriented at, for example, about thirty degrees relative to the ground, and the backward pivoting of guide 130 is limited to when top surface 158 of top plate 157 is oriented substantially parallel to the ground). Body 156 has a pair of rails 159 that together define a pathway 160 therebetween, wherein pathway 160 tapers toward a semi-circular pocket 161 of the pathway 160. Although rails 159 are spaced about six inches apart at an entrance 162 of pathway 160 in the illustrated embodiment, rails 159 may have any suitable spacing at entrance 162 in other embodiments.

In the illustrated embodiment, lock 120 is a U-shaped collar having a pair of fingers 163 each with a tip 164 and a hole 165 disposed near tip 164 to receive a retainer (e.g., a pin 103), and lock 120 also has a tab 166 for manually gripping lock 120. Together lock 120 and pin 103 make up aspects of a lock mechanism for securing ball adapter 110 to receiver adapter 105 as set forth in more detail below. Lock 120 is sized for insertion into body 156 of guide 130 to align holes 165 with a pair of corresponding holes 167 of guide 130 such that pin 103 is insertable through holes 167 of guide 130 and through holes 165 of lock 120 to retain lock 120 within body 156 of guide 130. In other embodiments, lock 120 may have any suitable shape and may be retained within body 156 in any suitable manner that facilitates permitting lock 120 to function as described herein.

With particular reference to FIGS. 31-35, receiver adapter 105 and ball adapter 110 are illustrated in their hitched state (i.e., a state in which receiver adapter 105 engages ball adapter 110 to form hitch 100 to facilitate towing a trailer using a vehicle). When attaching receiver adapter 105 to ball adapter 110, after attaching receiver adapter 105 to the vehicle and ball adapter 110 to the trailer, the vehicle may be driven in reverse toward the trailer such that guide 130 of receiver adapter 105 approaches rod 116 of ball adapter 110 and such that rails 159 facilitate directing rod 116 along pathway 160 and into pocket 161. As rod 116 is directed along pathway 160, top plate 114 of ball adapter 110 engages and slides along top surface 158 of top plate 157 of guide 130 to cause guide 130 to pivot backward against the bias of spring 106, thereby lifting ball adapter 110 (and, thus, the tongue of the trailer) farther away from the ground.

When rod 116 is ultimately situated within pocket 161, plates 114, 157 are seated face-to-face against one another in substantially parallel relation to the ground. In order to retain guide 130 in this position, a pin 102 is inserted through holes 172 of guide 130 and holes 169 of coupler 140 such that guide 130 is not forwardly pivotable relative to coupler 140. Also, to retain rod 116 within pocket 161, lock 120 is inserted into body 156 of guide 130 such that lock 120 wraps partly around rod 116 to align holes 165 of fingers 163 with holes 167 of guide 130, and pin 103 is then inserted through holes 165, 167 behind pocket 161 such that pin 103 and lock 120 together envelop—or surround—an entire circumference (or perimeter) of rod 116 to facilitate securing rod 116 in place relative to receiver adapter 105. Additionally, lock 130 nearly spans from bottom plate 112 to top plate 157 along rod 116 to further facilitate securing rod 116 in place relative to receiver adapter 105. With pins 101, 102, 103 inserted in this manner, receiver adapter 105 is securely hitched to ball adapter 110 to form hitch 100 by which the trailer is ready for towing from one location to another using the vehicle.

In order to detach the trailer from the vehicle, pin 103 is removed from holes 165, 167, and lock 120 is removed from guide 130 via tab 166, thereby detaching lock 120 from rod 116. Thus, when the vehicle is driven away from the trailer, rod 116 is permitted to fully exit pathway 160, thereby detaching ball adapter 110 from receiver adapter 105. Either before or after pin 103 is removed, pin 102 may also be removed to permit guide 130 to pivot into its oblique orientation as or after pin 116 is removed from pathway 160, such that receiver adapter 105 returns to its pre-hitched state in which receiver adapter 105 is ready for attachment to the same or another hitch ball adapter 110.

Among other benefits, the embodiments set forth herein facilitate more easily attaching a trailer to a vehicle for towing, and the embodiments set forth herein also facilitate more easily towing trailers of multiple sizes. Although some embodiments are illustrated and described herein, these embodiments are not intended to limit the scope of this disclosure to only those illustrated or described embodiments. Rather, the illustrated and described embodiments are merely intended to be examples for the person having ordinary skill in the art, and it is contemplated that the embodiments set forth herein may be suitably modified by the person having ordinary skill in the art in accordance with the broader teachings of this disclosure.

The invention claimed is:

1. A hitch comprising:
   a ball adapter including a rod and a ball sized for insertion into a tongue of a trailer; and
   a receiver adapter including:
      a guide having a pair of rails that define a pathway sized to receive the rod of the ball adapter; and
      a lock having a pair of fingers spaced apart from one another to receive the rod between the fingers such that, when the rod is in the pathway, the lock is positionable to wrap partly around the rod.

2. The hitch of claim 1, wherein the hitch further comprises a retainer insertable between the fingers such that, when the rod is received between the fingers and the retainer is inserted between the fingers, the retainer and the lock together surround the rod.

3. The hitch of claim 1, wherein the lock is a U-shaped collar.

4. The hitch of claim 1, wherein the fingers of the lock are pivotably attached to the guide.

5. The hitch of claim 4, wherein each finger of the lock has a cammed surface and a tip such that, when the rod engages the cammed surfaces, the tips of the fingers move toward the rod.

6. The hitch of claim 5, wherein the hitch further comprises a spring connecting the fingers to one another such that the tips of the fingers are biased away from one another via the spring.

7. The hitch of claim 1, wherein the ball adapter further includes: a bottom plate having an upper surface; and a top plate having an upper surface and a lower surface, such that the rod extends between the upper surface of the bottom plate and the lower surface of the top plate, and such that the ball extends from the upper surface of the top plate.

8. The hitch of claim 1, wherein the receiver adapter further comprises a base, a spring, and a pin, the guide pivotably attached to the base such that the guide is pivotably biased in a first direction and into a first position by the spring and such that the guide is pivotable against the bias of the spring in a second direction opposite the first direction and into a second position in which the pin is engageable to facilitate retaining the guide against pivoting.

9. A receiver adapter for a hitch, the receiver adapter attachable to a ball adapter having a rod, said receiver adapter comprising:
   a tube sized for insertion into a receiver socket of a towing frame;
   a guide having a pair of rails that define a pathway sized to receive the rod of the ball adapter; and
   a lock having a pair of fingers spaced apart from one another to receive the rod between the fingers such that, when the rod is in the pathway, the lock is positionable to wrap partly around the rod.

10. The receiver adapter of claim 9, wherein the receiver adapter further comprises a retainer insertable between the fingers such that, when the rod is received between the fingers and the retainer is inserted between the fingers, the retainer and the lock together surround the rod.

11. The receiver adapter of claim 9, wherein the lock is a U-shaped collar.

12. The receiver adapter of claim 9, wherein the fingers of the lock are pivotably attached to the guide.

13. The receiver adapter of claim 12, wherein each finger of the lock has a cammed surface and a tip such that, when the rod engages the cammed surfaces, the tips of the fingers move toward the rod.

14. The receiver adapter of claim 13, wherein the receiver adapter further comprises a spring connecting the fingers to one another such that the tips of the fingers are biased away from one another via the spring.

15. The receiver adapter of claim 14, wherein the receiver adapter further comprises a key movable into a position in which the key is disposed between the fingers.

16. The receiver adapter of claim 9, wherein the tube includes pin holes for removably fixing the tube within the receiver socket of the towing frame.

17. A guide for a receiver adapter of a hitch, the receiver adapter having a base, a spring, a pin, a lock with a pair of fingers, and a retainer insertable between the fingers of the lock to attach the receiver adapter to a rod of a ball adapter when the rod is received between the fingers, said guide comprising:
   a ledge; and
   a body including a pair of rails that define a pathway between the rails, the pathway sized to receive the rod of the ball adapter, wherein the body is hollow to receive the lock and the retainer such that, when the rod is received between the fingers, the retainer and the fingers together surround the rod,
   wherein the guide is pivotably attachable to the base such that the guide is pivotably biased in a first direction and into a first position by the spring and such that the guide is pivotable against the bias of the spring in a second direction opposite the first direction and into a second position in which the pin is engageable to facilitate, via the ledge, retaining the guide against pivoting.

* * * * *